(12) United States Patent
Robinson et al.

(10) Patent No.: US 10,399,709 B2
(45) Date of Patent: Sep. 3, 2019

(54) METHOD OF MAKING A DEVICE FOR CONTROLLING STRESS IN JOINTS AT CRYOGENIC TEMPERATURES

(75) Inventors: Michael J. Robinson, Huntington Beach, CA (US); Michael Leslie Hand, Huntington Beach, CA (US); Creed Ernest Blevins, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 1066 days.

(21) Appl. No.: 13/541,534

(22) Filed: Jul. 3, 2012

(65) Prior Publication Data

US 2013/0136527 A1    May 30, 2013

Related U.S. Application Data

(63) Continuation-in-part of application No. 12/175,735, filed on Jul. 18, 2008, now Pat. No. 8,656,571.

(51) Int. Cl.
| | |
|---|---|
| *B05D 3/00* | (2006.01) |
| *B05D 3/02* | (2006.01) |
| *B64G 1/40* | (2006.01) |
| *B64G 1/64* | (2006.01) |
| *B64G 1/66* | (2006.01) |
| *B64G 1/00* | (2006.01) |

(52) U.S. Cl.
CPC ............. *B64G 1/402* (2013.01); *B64G 1/64* (2013.01); *B64G 1/66* (2013.01); *B64G 1/002* (2013.01); *Y10T 403/27* (2015.01); *Y10T 442/20* (2015.04); *Y10T 442/2008* (2015.04); *Y10T 442/2631* (2015.04)

(58) Field of Classification Search
CPC ......... B84G 1/402; Y10T 403/27; B64G 1/64; B64G 1/66
See application file for complete search history.

(56) References Cited

U.S. PATENT DOCUMENTS

| | | |
|---|---|---|
| 2,755,216 A | 7/1956 | Lemons |
| 3,124,032 A | 3/1964 | Webster et al. |
| 3,124,034 A | 3/1964 | Esaosise |
| 3,243,150 A | 3/1966 | Woodcock |
| 3,400,849 A | 9/1968 | Pottier et al. |
| 3,814,275 A * | 6/1974 | Lemons ............... F17C 3/025 220/562 |
| 4,086,378 A | 4/1978 | Kam et al. |
| 4,331,723 A | 5/1982 | Hamm |

(Continued)

FOREIGN PATENT DOCUMENTS

| | | |
|---|---|---|
| CA | 2203863 | 10/1998 |
| CN | 102352089 A | 2/2012 |

(Continued)

OTHER PUBLICATIONS

The Chemours Company. Teflon. 2015. Chemours Company. https://www.chemours.com/Teflon_Industrial/en_US/assets/downloads/Chemours_Teflon_PTFE_DISP 30_Product_Info_K25654.pdf.*

(Continued)

*Primary Examiner* — Dah-Wei D. Yuan
*Assistant Examiner* — Kristen A Dagenais-Englehart
(74) *Attorney, Agent, or Firm* — Yee & Associates, P.C.

(57) ABSTRACT

A composite resin tank includes a wall joined to a dome along a joint. A softening strip is used to control stress in the joint.

27 Claims, 13 Drawing Sheets

(56) References Cited

U.S. PATENT DOCUMENTS

| | | | |
|---|---|---|---|
| 4,395,450 | A | 7/1983 | Whitener |
| 4,452,162 | A | 6/1984 | Harbaugh |
| 4,922,798 | A | 5/1990 | Ivsan et al. |
| 4,946,056 | A | 8/1990 | Stannard |
| 5,018,634 | A | 5/1991 | Le Touche |
| 5,026,595 | A | 6/1991 | Crawford, Jr. et al. |
| 5,338,383 | A | 8/1994 | Polackwoyj |
| 5,346,774 | A * | 9/1994 | Burgess ............... B29B 11/16 428/113 |
| 5,611,453 | A | 3/1997 | Schwartz et al. |
| 5,628,363 | A | 5/1997 | Dewar et al. |
| 5,651,474 | A | 7/1997 | Callaghan et al. |
| 5,655,600 | A | 8/1997 | Dewar et al. |
| 5,735,412 | A | 4/1998 | Shceckells |
| 5,788,907 | A * | 8/1998 | Brown, Jr. ............. B29C 70/22 264/280 |
| 5,845,399 | A | 12/1998 | Dewar et al. |
| 5,951,812 | A | 9/1999 | Gilchrist, Jr. |
| 6,019,243 | A | 2/2000 | Marino |
| 6,267,175 | B1 | 7/2001 | Anderson et al. |
| 6,374,570 | B1 | 4/2002 | McKague, Jr. |
| 6,422,514 | B1 | 7/2002 | Clark et al. |
| 6,562,436 | B2 | 5/2003 | George et al. |
| 6,689,448 | B2 | 2/2004 | George et al. |
| 6,709,538 | B2 | 3/2004 | George et al. |
| 6,712,099 | B2 * | 3/2004 | Schmidt ................ B29C 70/24 139/383 R |
| 6,757,954 | B2 | 7/2004 | Sei |
| 6,835,261 | B2 | 12/2004 | Schmidt |
| 6,846,758 | B2 * | 1/2005 | Bhatnagar ............. B32B 27/04 2/2.5 |
| 6,863,767 | B2 | 3/2005 | Bersuch et al. |
| 6,874,543 | B2 | 4/2005 | Schmidt et al. |
| 6,945,727 | B2 | 9/2005 | Christman et al. |
| 7,669,729 | B2 | 3/2010 | Matsuoka et al. |
| 7,790,294 | B2 | 9/2010 | Macguire et al. |
| 7,904,147 | B2 | 3/2011 | Schneider et al. |
| 8,042,767 | B2 | 10/2011 | Velicki et al. |
| 8,656,571 | B2 | 2/2014 | Hand |
| 8,917,809 | B2 | 12/2014 | Nozawa |
| 2001/0047862 | A1 | 12/2001 | Anderson et al. |
| 2003/0000641 | A1 * | 1/2003 | Schmidt ............ B29C 65/5071 156/307.3 |
| 2004/0084304 | A1 * | 5/2004 | Thompson ................ F41H 5/02 204/296 |
| 2005/0092917 | A1 | 5/2005 | Hirabayashi et al. |
| 2006/0065111 | A1 | 3/2006 | Henry |
| 2007/0239212 | A1 | 10/2007 | Schneider et al. |
| 2008/0124184 | A1 | 5/2008 | Scheckells |
| 2008/0256960 | A1 * | 10/2008 | Greason .................. F17C 3/04 62/53.2 |
| 2009/0042474 | A1 | 2/2009 | Lin et al. |
| 2009/0311166 | A1 | 12/2009 | Hart et al. |
| 2010/0012787 | A1 | 1/2010 | Hand |
| 2010/0080942 | A1 | 4/2010 | McCarville et al. |
| 2010/0116420 | A1 | 5/2010 | Matsuoka et al. |
| 2011/0049750 | A1 | 3/2011 | Bechtold |
| 2012/0018587 | A1 | 1/2012 | Robinson et al. |
| 2012/0205493 | A1 | 8/2012 | Robinson et al. |
| 2013/0193151 | A1 | 8/2013 | Robinson et al. |
| 2014/0077037 | A1 | 3/2014 | Hand |

FOREIGN PATENT DOCUMENTS

| | | |
|---|---|---|
| EP | 1149687 A2 | 10/2001 |
| EP | 2006074 A1 | 12/2008 |
| EP | 2354622 | 8/2011 |
| EP | 2439059 A2 | 4/2012 |
| JP | S4912162 A | 2/1974 |
| JP | S6151314 A | 3/1986 |
| JP | H01253315 A | 3/1988 |
| JP | H04272841 A | 9/1992 |
| JP | H0530191 A | 2/1993 |
| JP | 2004245348 A | 9/2004 |
| WO | WO9730321 | 8/1997 |
| WO | WO0216784 | 2/2002 |

OTHER PUBLICATIONS

The Chemours Company. Teflon. 2015. Chemours Company. https://www.chemours.com/Teflon_Industrial/en_US/assets/downloads/Chemours_Teflon_PTFE_DISP30_Product_Info_K25654.pdf (Year: 2015).*

Notice of Allowance, dated Feb. 5, 2016, regarding U.S. Appl. No. 13/541,560, 62 pages.

State Intellectual Property Office of China Third Notification of Office Action and English translation, dated Dec. 9, 2016, 8 pages.

State Intellectual Property Office of China Second Notification of Office Action and English translation, dated Jun. 28, 2016, 7 pages.

Office Action, dated Dec. 14, 2016, regarding U.S. Appl. No. 14/088,438, 39 pages.

Japanese Patent Office Notice of Reasons for Rejection, dated Feb. 27, 2017, regarding Application No. 2015-520210, 8 pages.

Final Office Action, dated Mar. 21, 2017, regarding U.S. Appl. No. 14/088,438, 20 pages.

Office Action, dated Mar. 22, 2017, regarding U.S. Appl. No. 14/594,131, 31 pages.

Japanese Patent Office Notice of Reasons for Rejection, dated Jun. 12, 2017, regarding Application No. 2015-520209, 9 pages.

Japanese Patent Office Notice of Reasons for Rejection, dated Jul. 24, 2017, regarding Application No. 2015-520210, 10 pages.

European Patent Office Examination Report, dated Sep. 22, 2017, regarding Application No. 13730398.8, 7 pages.

Final Office Action, dated Jul. 19, 2017, regarding U.S. Appl. No. 14/594,131, 21 pages.

Notice of Allowance, dated Nov. 1, 2017, regarding U.S. Appl. No. 14/088,438, 18 pages.

Final Office Action, dated Aug. 7, 2018, regarding U.S. Appl. No. 14/594,131, 21 pages.

Office Action, dated Sep. 20, 2018, regarding U.S. Appl. No. 15/175,041, 58 pages.

Notice of Allowance, dated Jan. 9, 2019, regarding U.S. Appl. No. 15/175,041, 9 pages.

GB search report dated Nov. 4, 2011 regarding application GB1111333.9, applicant The Boeing Company, 7 Pages.

Robinson et al., U.S. Appl. No. 13/027,429, title of invention Common Bulkhead for Composite Propellant Tanks, filed Feb. 15, 2011, 52 Pages.

Koch IV, U.S. Appl. No. 12/841,413, title of invention Toughened Composite Filler and Method of Making the Same, filed Jul. 22, 2010, 44 Pages.

Veedu et al., "Multifunctional composites using reinforced laminae with carbon-nanotube forests," Nature Materials (www.nature.com/naturematerials), vol. 5, Jun. 2006, pp. 457-462, accessed Jun. 4, 2012 http://image.sciencenet.cn/olddata/kexue.com.cn/blog/admin//images/upfiles/20085981740331929.pdf.

"2D Softened Y-Joint Simulation", DC-XA Task 2 Test Report 7.0.Doc, retrieved Jun. 27, 2008, pp. 1-9.

"Softening Strip Material Characterization", DC-XA Task 2 Test Report 6.0.Doc, retrieved Jun. 27, 2008, pp. 1-9.

Blanco et al., "Limiting Mechanisms of Mode I Interlaminar Toughening of Composites Reinforced with Alligned Carbon Nanotubes," Journal of Composite Materials, vol. 43, No. 8, Apr. 2009, 18 Pages.

Garcia et al., "Joining prepreg composite interfaces with aligned carbon nanotubes," Composites: Part A, Applied Science and Manufacturing, vol. 39, Issue 6, Jun. 2008, pp. 1065-1070.

Thomson, "'Nanostitching' could lead to much stronger airplane skins, more, Work could make airplane skins, other products 10 times stronger at a nominal additional cost," MIT News, Mar. 2009, 2 Pages, accessed Mar. 9, 2012 http://web.mit.edu/newsoffice/2009/nanostitching-0305.html.

Wardle et al., "Fabrication and Characterization of Ultrahigh-Volume-Fraction Aligned Carbon Polymer Composites," Advanced Materials, vol. 20, Issue 14, Jun. 2008, 8 Pages.

(56) References Cited

OTHER PUBLICATIONS

Wicks et al., "Interlaminar and intralaminar reinforcement of composite laminates with aligned carbon nanotubes," Composite Science and Technology (2009), vol. 70, Issue 1, Jan. 2010, 9 Pages.
USPTO restriction requirement dated May 23, 2011 regarding U.S. Appl. No. 12/175,735, 8 Pages.
Response to restriction requirement dated Jun. 23, 2011 regarding U.S. Appl. No. 12/175,735, 9 Pages.
USPTO non-final office action dated Sep. 12, 2011 regarding U.S. Appl. No. 12/175,735, 12 Pages.
Response to office action dated Dec. 12, 2011 regarding U.S. Appl. No. 12/175,735, 9 Pages.
USPTO final office action dated Jan. 20, 2012 regarding U.S. Appl. No. 12/175,735, 9 Pages.
PCT search report dated May 4, 2012 regarding application PCT/US2011/065549, filing date Dec. 16, 2011, applicant reference 10-1002PCT, applicant The Boeing Company, 12 Pages.
Amendment filed with RCE dated Apr. 20, 2012 regarding U.S. Appl. No. 12/175,735, 11 Pages.
Robinson et al., "Composite Tank Having Joint with Softening Strip and Method of Making the Tank," U.S. Appl. No. 13/541,560, filed Jul. 3, 2012, 55 Pages.
International Search Report, dated May 4, 2012, regarding Application No. PCT/US2011/065549, 12 pages. (10-1002PCT).
Robinson et al., "Fabric Preform Insert for a Composite Tank Y-Joint," U.S. Appl. No. 12/838,586, filed Jul. 19, 2010, 42 pages. (10-0254).
Office Action, dated Oct. 15, 2012, regarding U.S. Appl. No. 12/841,413, 18 pages.
Final Office Action, dated Mar. 6, 2013, regarding U.S. Appl. No. 12/841,413, 11 pages.
Search and Examination Report, dated Jan. 7, 2013, regarding Application No. GB1111333.9, 3 pages.
Office Action, dated Jul. 3, 2013, regarding U.S. Appl. No. 12/841,502, 42 pages.
Office Action, dated Aug. 16, 2013, regarding U.S. Appl. No. 13/027,429, 37 pages.
Notice of Allowance, dated Oct. 9, 2013, regarding U.S. Appl. No. 12/175,735, 33 pages.
International Search Report and Written Opinion, dated Nov. 19, 2013, regarding Application No. PCT/US2013/043455, 9 pages.
Final Office Action, dated Feb. 5, 2014, regarding U.S. Appl. No. 13/027,429, 18 pages.
Final Office Action, dated Jan. 16, 2014, regarding U.S. Appl. No. 12/841,502, 16 pages.
International Search Report and Written Opinion, dated May 21, 2014, regarding Application No. PCT/US2013/043471, 11 pages.
Office Action, dated Jul. 10, 2014, regarding U.S. Appl. No. 12/841,502, 23 pages.
Office Action, dated Jul. 8, 2014, regarding U.S. Appl. No. 13/027,429, 17 pages.
Notice of Allowance, dated Oct. 7, 2014, regarding U.S. Appl. No. 13/027,429, 17 pages.
Notice of Allowance, dated Oct. 10, 2014, regarding U.S. Appl. No. 12/841,502, 19 pages.
International Preliminary Report on Patentability, dated Jan. 15, 2015, regarding Application No. PCT/US2013/043455, 7 pages.
International Preliminary Report on Patentability, dated Jan. 15, 2015, regarding Application No. PCT/US2013/043471, 7 pages.
State Intellectual Property Office of China First Notification of Office Action and English translation, dated Oct. 28, 2015, 12 pages.
European Patent Office Communication, dated Nov. 20, 2015, regarding Application No. EP13730398.8, 4 pages.
State Intellectual Property Office of China First Notification of Office Action English Translation, regarding Application No. 201380035040.3, dated Feb. 3, 2016, 5 pages.

\* cited by examiner

METHOD OF MAKING A DEVICE FOR CONTROLLING STRESS IN JOINTS AT CRYOGENIC TEMPERATURES

CROSS REFERENCE TO RELATED APPLICATIONS

This application is a continuation-in-part of U.S. patent application Ser. No. 12/175,735 filed Jul. 18, 2008, which issued as U.S. Pat. No. 8,656,571 the entire disclosure of which is incorporated by reference herein. This application is also related to a U.S. patent application entitled "COMPOSITE TANK HAVING JOINT WITH SOFTENING STRIP AND METHOD OF MAKING THE TANK", U.S. Pat. No. 13/541,560 filed even date herewith, which issued as U.S. Pat. No. 9,453,293.

BACKGROUND INFORMATION

1. Field

The present disclosure generally relates to structural joints, especially bonded joints in composite structures, and deals more particularly with a device for controlling stress in the joint at low temperatures, and with a method of making the device.

2. Background

Certain structures may be specifically designed for use in cryogenic environments. For example, spacecraft and launch vehicles may employ tanks to store solid propellants or liquid fuels such as liquid hydrogen and/or liquid oxygen at cryogenic temperatures, typically below −238 degrees Fahrenheit. In order to reduce weight of the spacecraft or launch vehicle, the tank may be formed of several composite parts that are attached to each other by one or more joints. In one such application, the composite tank includes a cylindrical outer wall having a skirt joined to dome-shaped ends by bonded lap joints that are Y-shaped in cross section.

In composite cryogenic tanks of larger diameters, e.g. diameters of greater than approximately than 14 to 16 feet, the line loads in the bonded joints may result in unacceptably high levels of peak stresses in the joint, presenting the possibility of a joint leak. In order to increase the strength of the Y-joint, it may be possible to place a softening strip in a notch area of the joint. The softening strip may reduce shear stress peaking that occurs in the bond line by enabling a smoother load transmission between structures. This could be accomplished at ambient temperatures using a softening strip formed of a material such as rubber, however, at cryogenic temperatures, rubber and many other conventional materials may not remain soft, but instead harden. Upon hardening at cryogenic temperatures, the softening strip may no longer be capable of controlling shear stress in the joint.

Known materials that may be used as softening strips present several other problems in cryogenic environments. For example, such materials typically have a coefficient of thermal expansion (CTE) that may be incompatible with other composite components of the joint which have a relatively low CTE. This mis-match of CTE's may create undesirable thermally-induced stresses in the joint at cryogenic temperatures. Adding to the challenge of designing an effective softening strip is the fact that the softening strip must remain stable at the temperatures at which the other composite resin components of the tank are thermally cured. Also, it is desirable that that softening strip be able to be machined into a shape that is specific to the particular joint application.

Accordingly, there is a need for a softening strip device that is effective in controlling stresses in joints at cryogenic temperatures. There is also a need for a method of making a softening strip of the type mentioned above that is relatively simple, effective and well-suited for use in production environments.

SUMMARY

The disclosed embodiments provide a device for reducing peak stresses in joints at cryogenic temperatures. The device comprises a softening strip placed in a notch in the joint that remains soft, flexible and compliant at cryogenic temperatures, and which is effective in linearizing the stress in the joint. The softening strip may be used to transfer line loads in relatively large composite structures, and remains stable at the temperatures at which thermosetting resins used in the structures are typically cured.

According to one disclosed embodiment, a device is provided for controlling stress in a joint between two surfaces. The device comprises a three dimensional fabric adapted to be placed in the joint. The three dimensional fabric is porous and includes fibers coated with a plastic binder. The three dimensional fabric includes one of woven fibers, braided fibers, stacked layers of fibers, stitched fibers, and pinned layers of fibers. The fibers are selected from the group consisting of graphite fibers, glass fibers, aramid fibers and metal fibers. The fibers include fibers extending along three substantially orthogonal axes, and may include fibers having a diameter within the range of approximately 2 and 15 microns. The plastic binder is a polymer that is compliant at both room temperature and at cryogenic temperatures. The plastic binder may be a fluoropolymer exhibiting elastic compliance at temperatures below approximately −150° F. and stability at temperatures up to approximately 400° F. or more.

According to another embodiment, a structural assembly comprises a first composite resin structure having a first surface and a second composite resin structure having a second surface. The assembly further comprises a joint between the first and second surfaces, and a softening strip for controlling stress in the joint. The joint may be Y-shaped, and the softening strip may be wedge shaped in cross section. The softening strip may be configured to linearize the stress in the joint at cryogenic temperatures. The softening strip is a three dimensional fabric including fibers having a plastic coating that is elastically compliant at cryogenic temperatures. The plastic coating is a polymer having a melting point higher than a temperature required to cure the first and second composite resin structures. The fabric is porous, and the fibers are flexible and movable relative to each other in response to loads transmitted through the joint while at cryogenic temperatures.

According to still another embodiment, a method is provided of making a softening strip for controlling stress in a joint. The method comprises producing a fabric perform having fibers extending in three dimensions, and coating surfaces of the fibers with a thermoplastic polymer binder. Coating the surface of the fibers includes preparing an aqueous solution containing particles of the thermoplastic polymer binder, immersing the fabric in the aqueous solution, and adhering the binder particles to the surface of the fibers by drying the fabric. Coating the surfaces of the fibers may also includes placing the infused fabric in a vacuum, and using the vacuum to draw air bubbles from the aqueous solution that are trapped within the fabric. Coating the surface of the fibers further includes heating the binder particles adhered to the fibers until the binder particles melt and flow together around the fibers. The method further comprises loosening any bonds formed between the coated fibers by cold working the fabric. Cold working the fabric is performed by passing the fabric through and compressing the fabric between a pair of rollers, or pressing the fabric between two dies. The method may also comprise shaping the fabric as the bonds between the coated fibers are being loosened, and machining the fabric with the coated fibers to a desired shape suited to the joint.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosed embodiments are set forth in the appended claims. The disclosed embodiments, however, as well as a preferred mode of use, further objectives and advantages thereof, will best be understood by reference to the following detailed description of embodiments of the present disclosure when read in conjunction with the accompanying drawings, wherein:

DETAILED DESCRIPTION

Figure 1:
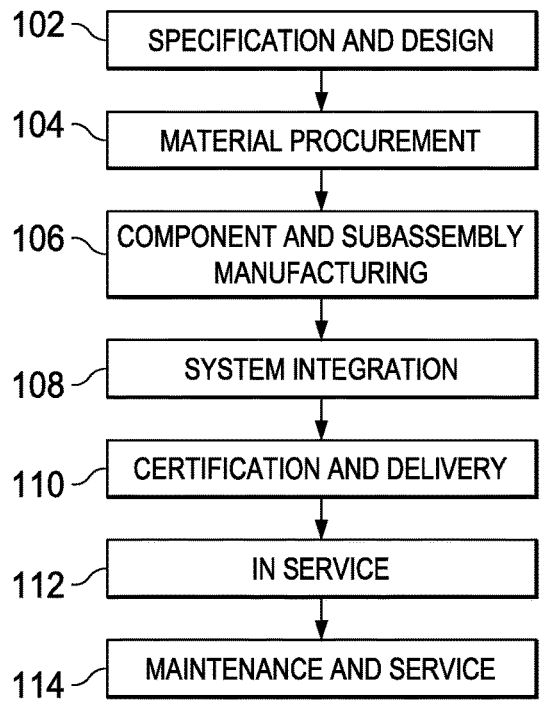
FIG. 1 is an illustration of a diagram showing a spacecraft manufacturing and service method in which an embodiment may be implemented.
Figure 2:
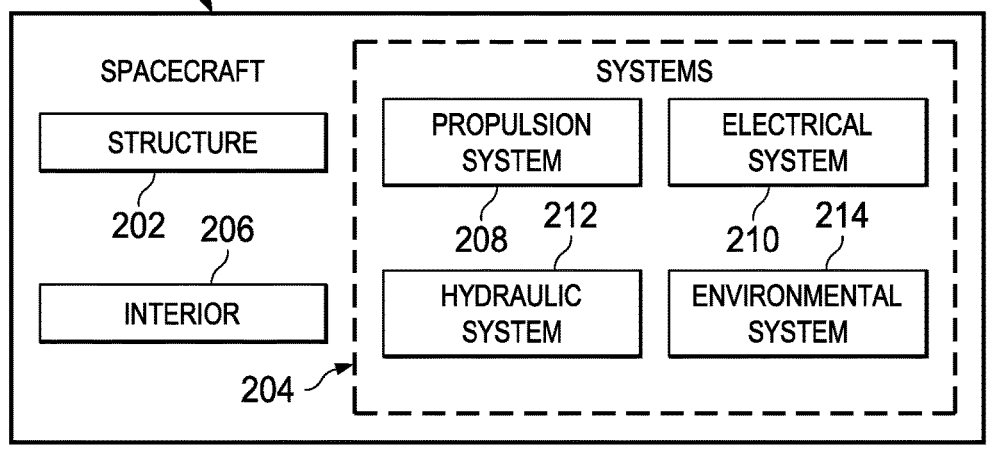
FIG. 2 is an illustration of a diagram of a spacecraft in which embodiments may be implemented.

Referring more particularly to the drawings, embodiments of the disclosure may be described in the context of the spacecraft manufacturing and service method 100 as shown in FIG. 1 and spacecraft 200 as shown in FIG. 2. Turning first to FIG. 1, a diagram illustrating a spacecraft manufacturing and service method is depicted in accordance with one disclosed embodiment.

During pre-production, exemplary spacecraft manufacturing and service method 100 may include specification and design 102 of spacecraft 200 in FIG. 2 and material procurement 104. During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service by a customer, spacecraft 200 in FIG. 2 is scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, for example, without limitation, any number of venders, subcontractors, and suppliers; and an operator may be a country, leasing company, military entity, service organization, and so on.

With reference now to FIG. 2, a diagram of a spacecraft is depicted in which embodiments may be implemented. In this example, spacecraft 200 may be produced by spacecraft manufacturing and service method 100 in FIG. 1. Spacecraft 200 may include structure 202 with a plurality of systems 204 and interior 206. Examples of systems 204 include, for example, without limitation, one or more of propulsion system 208, electrical system 210, hydraulic system 212, and environmental system 214. Any number of systems may be included. Further, in some implementations some of the systems may not be needed. For example, when spacecraft 200 takes the form of a launch vehicle, environmental system 214 may be unnecessary.

Apparatus and methods embodied herein may be employed during any one of stages of spacecraft manufacturing and service method 100 in FIG. 1. For example, components or subassemblies produced in component and subassembly manufacturing 106 in FIG. 1 may be fabricated or manufactured in a manner similar to components or subassemblies produced while spacecraft 200 is in service 112 in FIG. 1.

Also, one or more apparatus embodiments, method embodiments, or a combination thereof may be utilized during production stages, such as component and subassembly manufacturing 106 and system integration 108 in FIG. 1 as an example, without limitation. These embodiments may substantially expedite the assembly of or reduce the cost of spacecraft 200.

In these examples, embodiments may be implemented to attach components in propulsion system 208 to structure 202 in spacecraft 200. The different embodiments may be applied to attach any structure within spacecraft 200 to any other structure in other implementations.

The different embodiments take into account that it may be desirable to increase the strength of currently available joints between the structure of a spacecraft and a tank containing a propellant above current levels with respect to various forces. Forces on the joint may include, for example, without limitation, shear forces at the joint between the structure of a spacecraft and a tank. Current tanks may be metal tanks that typically use welded joints. In these examples, the joints may take the form of Y-joints. Composite tanks may be employed to provide weight savings over metal tanks. With these types of composite tanks, however, Y-joints with increased strength may not be possible with currently available Y-joint designs and techniques.

The different embodiments may use a softening strip to extend the strength of a bonded Y-joint between two structures. For example, without limitation, currently available large solid rocket motors may use a rubber softening strip in the Y-joints. The different embodiments take into account and recognize that a difficulty may be present in finding an appropriate material for a softening strip that may be usable for the different operating temperatures. With cryogenic tanks, these temperatures may be very low temperatures, such as, for example, without limitation, below −238 degrees Fahrenheit. These temperatures may also be referred to as cryogenic temperatures.

The different embodiments recognize that an appropriate material may remain soft at the different operating temperatures. Rubber materials, as currently used in solid rocket motors, may not be usable at cryogenic temperatures because these materials may become too stiff. The material needed may remain soft relative to the adherends while at cryogenic temperatures. An adherend may be a body attached to another body by the means of adhesive substance.

The different embodiments also take into account and recognize that a softening strip may have a coefficient of thermal expansion that may be matched or within some threshold limits of the adherends to prevent joint failure from thermally induced stresses.

Thus, the different embodiments provide a method and apparatus for reinforcing or forming joints, such as, for example, without limitation, Y-joints. In the different embodiments, a three-dimensional preform may be present in which a plastic matrix is impregnated into the three-dimensional preform to form a softening strip. This softening strip may be capable of remaining flexible at a temperature at which a material has a liquid form and in which the material has a gas form at an ambient temperature. In other words, the different embodiments may be used at temperatures at which a gas has a liquid state or form. As an example, without limitation, the softening strip may be capable of remaining flexible at cryogenic temperatures. A cryogenic temperature may be a temperature at which constituents of air may liquefy. A cryogenic temperature may be, for example, temperatures below around −150 degrees centigrade.

Figure 3:
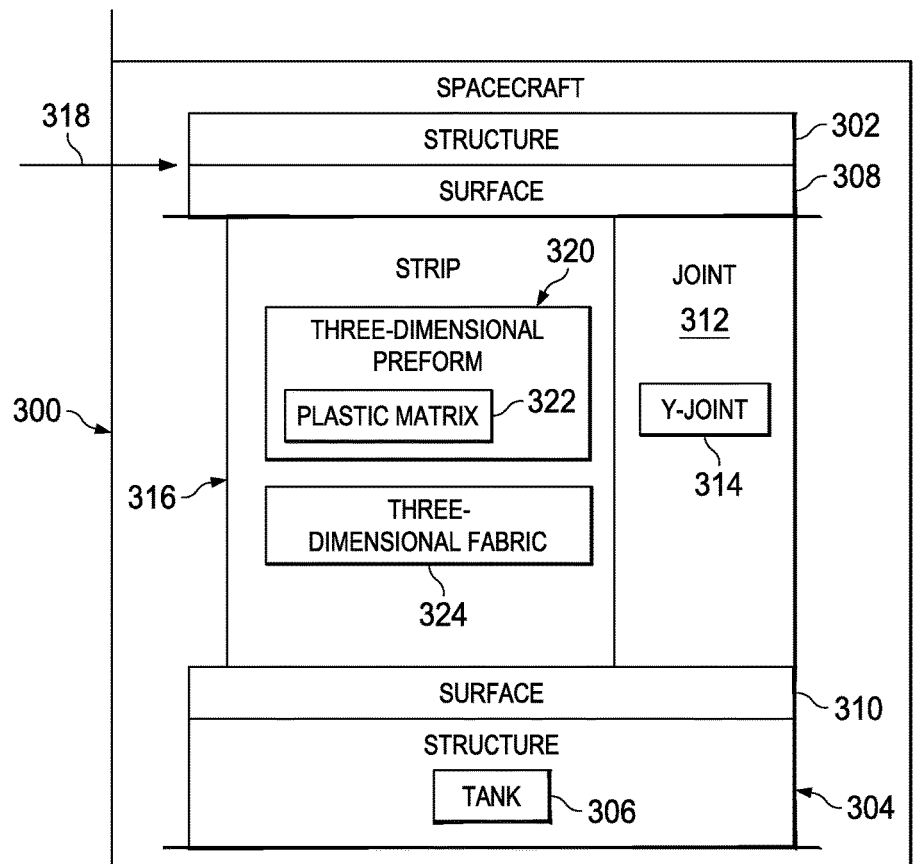
FIG. 3 is an illustration of a diagram showing a spacecraft in accordance with a disclosed embodiment.

With reference now to FIG. 3, a diagram illustrating a spacecraft is depicted in accordance with another embodiment. Spacecraft 300 is an example of spacecraft 200 in FIG. 2. In this example, spacecraft 300 may include structure 302 and structure 304. Structure 302 may be the structure of the spacecraft providing a frame or other support for other components in spacecraft 300. Structure 304, in this example, may be, for example, without limitation, tank 306. Of course, structure 304 may be any other component that may be located within spacecraft 300 that is to be attached to structure 302.

Surface 308 of structure 302 may be attached to surface 310 of structure 304 to form joint 312. In these examples, joint 312 may take the form of Y-joint 314. The attachment, in these examples, may be performed by bonding surface 308 to surface 310. Bonding may be a process for fastening components or structures to each other. In these examples, bonding may be performed in a number of different ways. Bonding may include, for example, without limitation, using adhesives, welding, fasteners, curing processes, or some other suitable process.

The different embodiments may be applied to any type of structural joint such as, for example, without limitation, a joint in which loads peak near the shortest, stiffest load paths into a joint and then fall off to longer, softer load paths. Any extensive shear carrying lap joint may tend to transfer load more rapidly at the edges of the joint than away from the edges. This situation may be a consequence of load distribution through a structure being proportional to the relative stiffness of the available load paths.

Given the same cross-sectional areas, short load paths may be stiffer than long load paths. This situation may create the familiar phenomenon of shear peaking at joint ends. If an additional soft load path can be created outside the start of such a joint, part of the total load can be transferred through this additional path, lowering the load to be carried by the original joint and reducing shear peaking. This may be a feature of the softening strip.

A refinement in some joints may be to taper the softening strip so that the stiffness of the secondary load paths may be continually increased as the loads approach original joint. This feature may result in a more uniform transfer of shear across the joint at a consistent low level. This transfer may occur instead of the abruptly peaking shear characteristic of the simple lap joint or the two, more moderate, shear peaks that may be created by using a uniform thickness softening strip.

In this depicted example, strip 316 may be attached to surface 308 and surface 310 in and/or near joint 312. Strip 316 may act as a softening strip to increase the strength of joint 312 with respect to forces that may be applied to joint 312. These forces may include, for example, without limitation, shear forces on structures 302 and 304. In these examples, a shear force may be a force applied to structures 302 and 304 in the direction of line 318.

In the different embodiments, strip 316 may include three-dimensional preform 320 and plastic matrix 322. Three-dimensional preform 320 may be a three-dimensional structure and may take the form of three-dimensional fabric 324. This fabric may be, for example, without limitation, a fabric comprised of at least one of woven fibers, braided fibers, stacked fabric layers, and/or some other suitable material. When fibers are used, these fibers may include, for example, without limitation, graphite fibers, glass fibers, aramid fibers, metal fibers, or any other suitable structure fiber.

As used herein, the phrase "at least one of", when used with a list of items, means that different combinations of one or more of the items may be used, and only one of each item in the list may be needed. For example, "at least one of item A, item B, and item C" may include, for example, without limitation, item A, or item A and item B. This example also may include item A, item B, and item C, or item B and item C.

Plastic matrix 322 may be comprised of any plastic material that may retain or provide flexibility at operating temperatures for tank 306. Operating temperatures for tank 306 may be temperatures at or near cryogenic temperatures. In these examples, a plastic may be any synthetic or semi-synthetic polymerization material or product. Polymerization may be a process of reacting monomer molecules together in a chemical reaction to form linear chains or a three-dimensional network of polymer chains. Examples of types of plastics that may be used include, for example, without limitation, fluorocarbons and urethanes. One example of a fluorocarbon that may be used is a Teflon®. polymer. Teflon® is a registered trademark of DuPont Company.

In this manner, tank 306 may be attached to structure 302 with joint 312 being formed in which strip 316 may be present. The use of strip 316 may provide additional reinforcement to add strength to resist various forces, such as, for example, without limitation, shear forces that may be applied to structure 304 and tank 306.

The illustration of spacecraft 300 in FIG. 3 is provided to illustrate one implementation for various embodiments. This illustration is not meant to imply architectural or physical limitations to a manner in which the different embodiments may be implemented. For example, structure 302 and structure 304 may be structures within another vehicle other than spacecraft 300. For example, the structures may be ones present in an aircraft. In other embodiments, spacecraft 300 may take the form of a spacecraft such as, for example, without limitation, a shuttle, a launch vehicle, a combination of a space shuttle and launch vehicle, or some other suitable vehicle capable of space travel.

Figure 4:
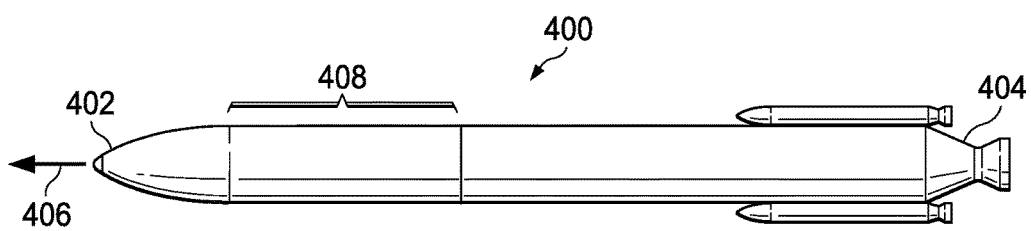
FIG. 4 is an illustration of a diagram of a spacecraft in accordance with a disclosed embodiment.

With reference now to FIG. 4, a diagram of a spacecraft is depicted in accordance with an embodiment. In this example, launch vehicle 400 is an example of one implementation of spacecraft 300 in FIG. 3. Launch vehicle 400 has forward section 402 and aft section 404. Launch vehicle 400 may have longitudinal axis 406. Launch vehicle 400 is an example of a spacecraft in which Y-joint 314 in FIG. 3 may be implemented. Section 408 may be an example of a portion of launch vehicle 400 in which Y-joint 314 may be found and/or implemented.

Figure 5:
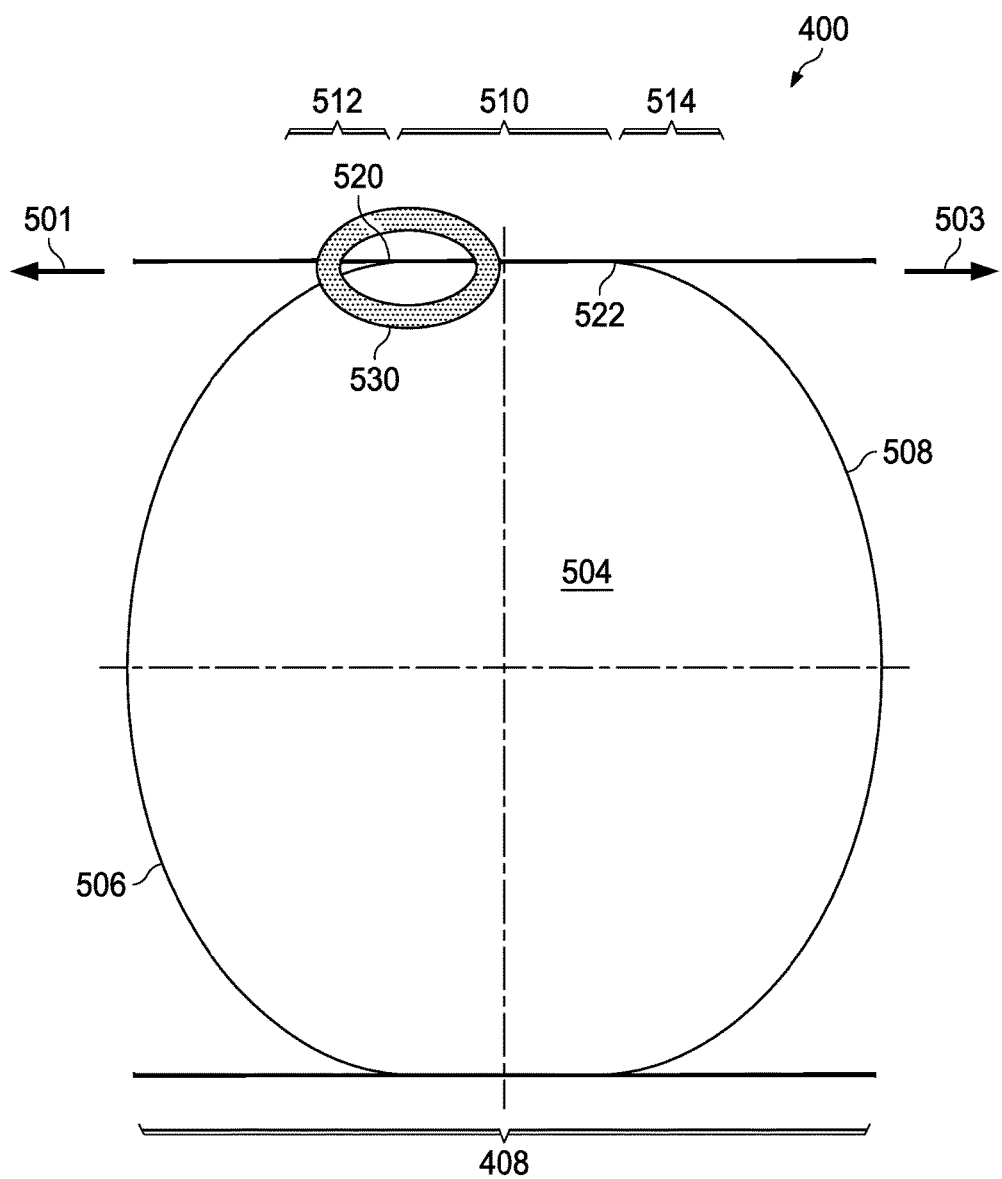
FIG. 5 is an illustration of a diagram of a cross-sectional portion of a launch vehicle in accordance with a disclosed embodiment.

With reference now to FIG. 5, a diagram of a cross-sectional portion of a launch vehicle is depicted in accordance with an embodiment. In this diagram, a cross-section of section 408 of launch vehicle 400 along longitudinal axis 406 is depicted.

In this example, arrow 501 points towards the forward part of launch vehicle 400, while arrow 503 points to the aft portion of launch vehicle 400.

In this illustrative example, tank 504 in launch vehicle 400 may include dome 506, dome 508, and wall 510. Wall 510 may be a cylindrical wall in these examples. Wall 510 may be attached to forward skirt 512 and aft skirt 514. Wall 510 may be located between forward skirt 512 and aft skirt 514. In this example, wall 510 may be a pressurized portion of tank 504, while forward skirt 512 and aft skirt 514 may be located at unpressurized portions of tank 504.

Forward skirt 512 and aft skirt 514 are examples of structures to which tank 504 may be attached. In these examples, these different structures may be cylindrical in form of which only a cross-section may be seen in FIG. 5. In this depicted example, Y-joint 520 and Y-joint 522 may be present. Y-joint 520 may be formed from the intersection of dome 506, wall 510 and forward skirt 512. Y-joint 522 may be formed at the intersection of dome 508, wall 510, and aft skirt 514. In these examples, Y-joint 520 and Y-joint 522 may be continuous in circumferential direction around axis 524.

In these examples, tank 504 may take the form of a composite cryogenic tank. Tank 504 may hold a propellant, such as, for example, without limitation, liquid hydrogen and/or liquid oxygen. In this example, tank 504 may hold liquid hydrogen. In this example, tank 504 may be greater than around 16 feet in diameter. A more detailed illustration of Y-joint 520 in section 530 is shown in FIG. 6 below.

Figure 6:
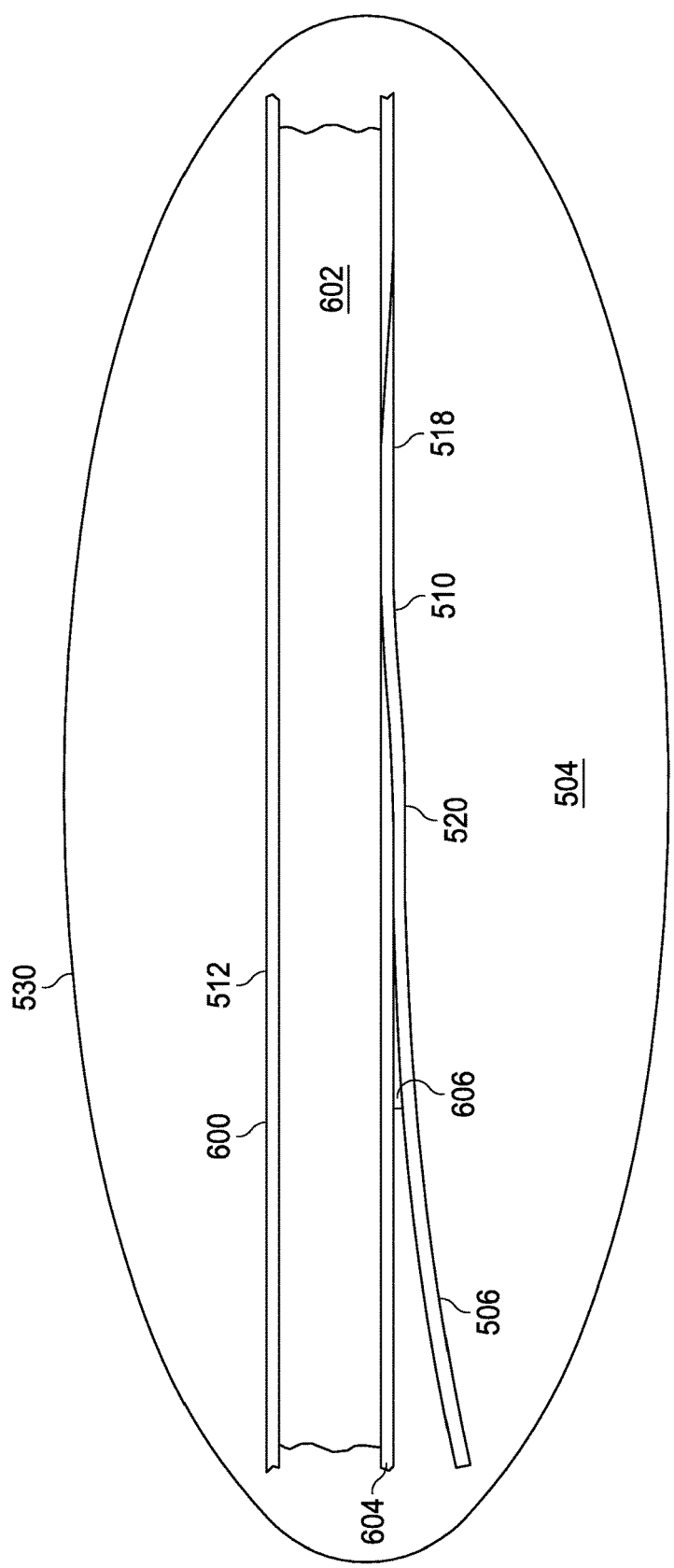
FIG. 6 is an illustration of a diagram of a joint in accordance with a disclosed embodiment.

Turning now to FIG. 6, a diagram of a joint is depicted in accordance with a further embodiment. As illustrated in section 530, forward skirt 512 may include outboard skin 600, core 602, and inboard skin 604. In this example, outboard skin 600 and inboard skin 604 may be face sheets with core 602 being located between those face sheets. Core 602 may be a low density structure element. Core 602 may be used, amongst other uses, to transmit loads between outboard skin 600 and inboard skin 604. Core 602 may take various forms. For example, core 602 may have flutes, honeycombs, or other suitable forms. In these examples, a fluted structure may be a desired structure for core 602.

In this illustrative example, Y-joint 520 may be formed at the intersection of dome 506, wall 510, and forward skirt 512. Y-joint 520 may have softening strip 606 located in or near Y-joint 520. Softening strip 606 may be bonded to inboard skin 604 and tank 504.

In the different embodiments, softening strip 606 may be co-bonded to inboard skin 604 and tank 504 along with the bonding of inboard skin 604 to tank 504. In other words, these different components may be co-bonded to each other at the same time. The co-bonding, in these examples, may take the form of one or more curing processes in which the composite components in softening strip 606, inboard skin 604, and tank 504 may be cured to bond these components to each other.

The illustration of tank 504 is presented for purposes of depicting one manner in which different embodiments may be implemented. The softening strip 606, in the different embodiments, may be applied to other tank and/or skirt geometries. For example, although tank 504 is shown with a cylindrical wall, other tank configurations may be employed. As an example, a conical wall for wall 510 may be used. Also, other tanks may not be readily symmetric. Regardless of the structure or shape of tank 504, a Y-joint may be used.

Figure 7:
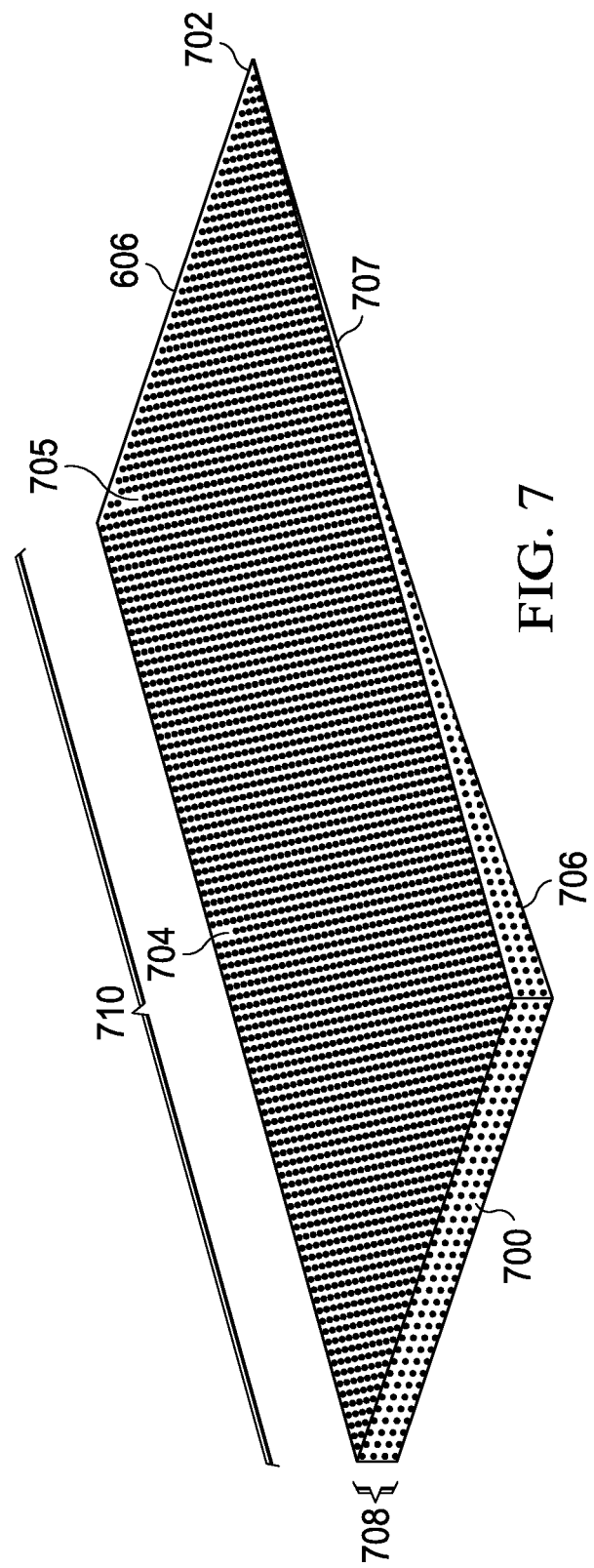
FIG. 7 is an illustration of a diagram showing a softening strip in accordance with a disclosed embodiment.

With reference now to FIG. 7, a diagram illustrating a softening strip is depicted in accordance with an embodiment. In the illustrated example, softening strip 606 is shown in a perspective view. The illustration of softening strip 606 in this example is only a portion of softening strip 606. Softening strip 606 may be circular in shape to follow the perimeter of wall 510. The dimensions of softening strip 606 may vary depending on the particular implementation. In this example, end 700 of softening strip 606 may have a thickness of around 0.2 inches in section 708. In these examples, end 702 may have a thickness that is as thin as practicable to prevent introduction of a stress riser in Y-joint 520. In these illustrative examples, a thickness of end 702 may be as thin as practical, based on the ease of manufacturing and/or handling.

With respect to the use of softening strip 606 in Y-joint 520, softening strip 606 may have a length of around 4 inches from end 700 to end 702 as shown in section 710. Further, softening strip 606 may extend around the full circumference of tank 504 in these examples. Other dimensions of softening strip 606 may vary depending on the particular implementation. Of course, softening strip 606 may have any dimensions needed to be placed within a Y-section or other space in a joint between structures. Although a constant and/or uniform cross-section is shown for softening strip 606, the cross-section may vary depending on the configuration of the joint.

Softening strip 606 may be shaped in a manner to fit within Y-joint 520 as shown in FIG. 6. In this example, softening strip 606 may have a wedge shape in which softening strip 606 may be thicker at end 700 than at end 702.

Faying surface 704 on side 705 of softening strip 606 may be bonded to inboard skin 604 in FIG. 6 and faying surface 706 on side 707 of softening strip 606 may be bonded to tank 504 in FIG. 5. Softening strip 606 may be co-cured with the other components forming Y-joint 520 as shown in FIG. 6.

Figure 8:
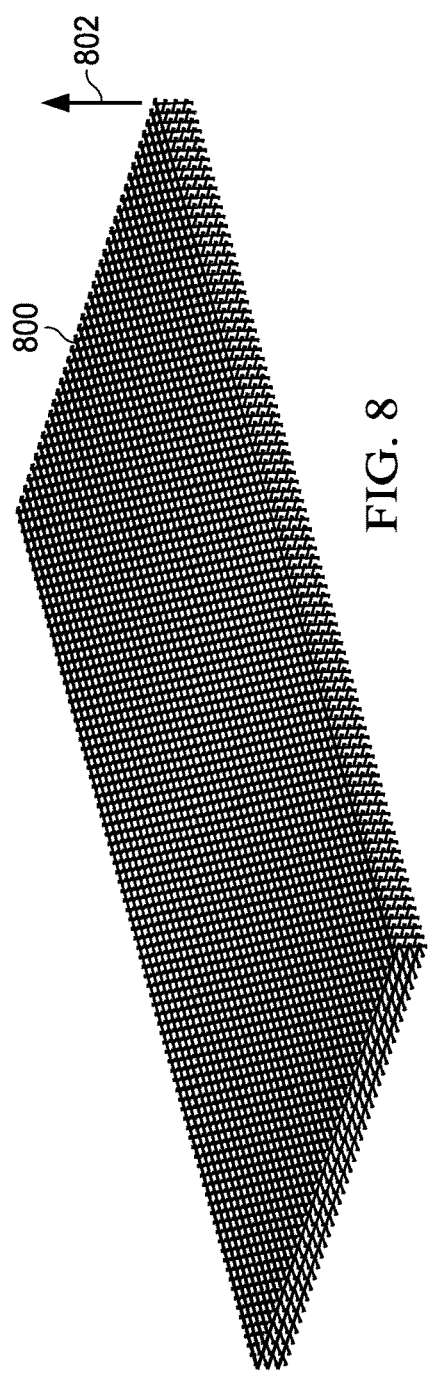
FIG. 8 is an illustration of a diagram showing a three-dimensional preform in accordance with a disclosed embodiment.

With reference now to FIG. 8, a diagram of a three-dimensional preform is depicted in accordance with an embodiment. Preform 800 is an example of three-dimensional preform 320 in FIG. 3.

In the illustrative example, preform 800 may be a woven three-dimensional graphite fiber preform. Of course, other types of materials and other types of structures may be used for preform 800. Other examples of materials that may be used in preform 800 include, for example, without limitation, fiberglass fibers, boron fibers, aramid fibers, polyethylene fibers, and other suitable materials. Preform 800 may be formed from braided fibers or stacked or layered fabric. The stack of fabric materials may then be held together using z-pinning in which pins may be inserted and pushed into the stack of fabric in an autoclave with pressure. As another example, fabric materials for preform 800 may be stitched to each other in the third dimension as indicated by arrow 802.

Figure 9:
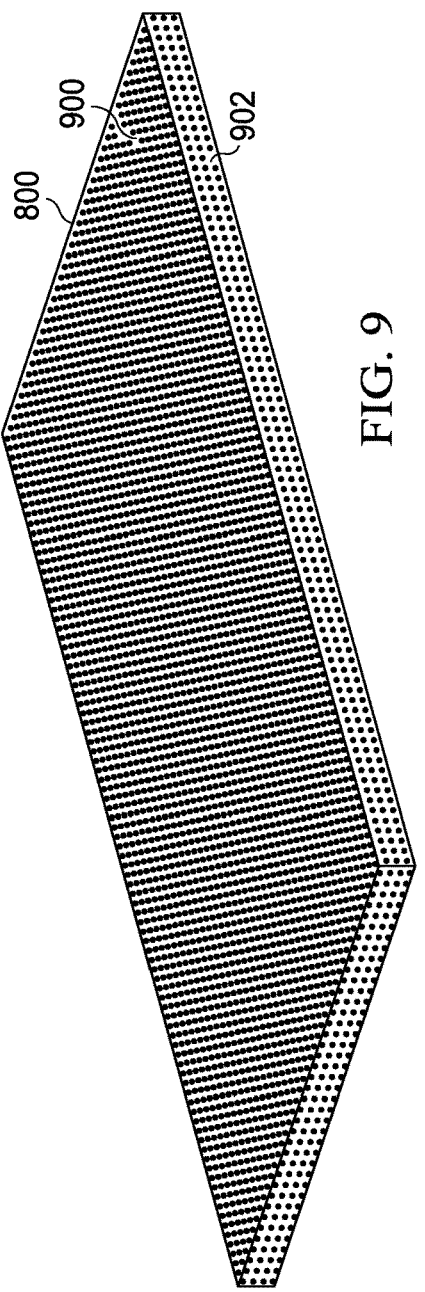
FIG. 9 is an illustration of a diagram showing a softening strip in accordance with a disclosed embodiment.

With reference now to FIG. 9, a diagram illustrating a softening strip is depicted in accordance with an embodiment. In this example, preform 800 may have been infused with plastic matrix 900. The plastic material within plastic matrix 900 may be placed into preform 800 using any method or process suitable for placing plastic matrix 900 into preform 800.

In these examples, plastic matrix 900 may be any plastic material capable of maintaining flexibility at temperatures in which a material may be in a liquid form when that material normally may be in a gas form at ambient temperatures. In these examples, ambient temperature may be the temperature of the environment around the spacecraft. In other words, the ambient temperature may be the temperature in the air around the spacecraft when the spacecraft is on the ground.

This combination of preform 800 and plastic matrix 900 forms softening strip 902. Softening strip 902 may then be machined, cut, and/or formed in some other suitable fashion in a shape, such as softening strip 606 in FIG. 6 for use in a Y-joint.

Preform 800 may restrain softening strip 902 against excessive thermal shrinkage that may be associated with high coefficients of expansion. These high coefficients of expansion may be typical of softening strip matrix materials, such as those for plastic matrix 900, which may remain flexible at cryogenic temperatures. Excessive shrinkage in any direction may create thermally induced stresses in the bond lines between softening strip 902 and any adjacent structure. These types of stresses may weaken the joint. As a result, softening strip 902 may be constructed with preform 800 to provide three-dimensional reinforcement, rather than two-dimensional reinforcement.

Figure 10:
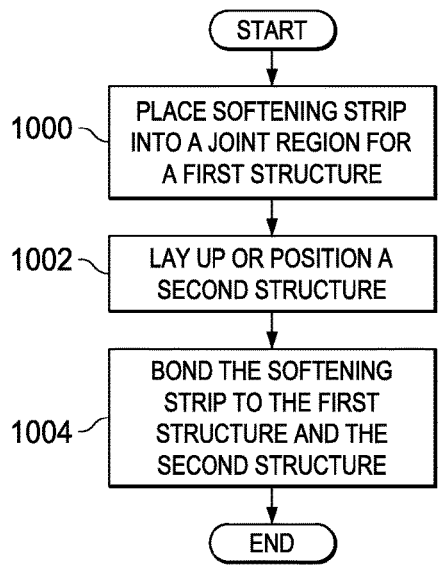
FIG. 10 is an illustration of a flowchart of a process for creating a Y-joint in a structure in accordance with a disclosed embodiment.

With reference next to FIG. 10, a flowchart of a process for creating a Y-joint in a structure is depicted in accordance with an embodiment. The process illustrated in FIG. 10 may be used to create a joint between a first structure and a second structure.

The process begins by placing a softening strip into a joint region for a first structure (operation 1000). The softening strip is capable of remaining flexible at a temperature at which the gas has a liquid form. The process then lays up and/or positions a second structure (operation 1002). Thereafter, the softening strip is bonded to the first structure and the second structure to form the joint (operation 1004), with the process terminating thereafter. This bonding may be performed using various mechanisms, including co-curing, curing, or other suitable bonding techniques.

Figure 11:
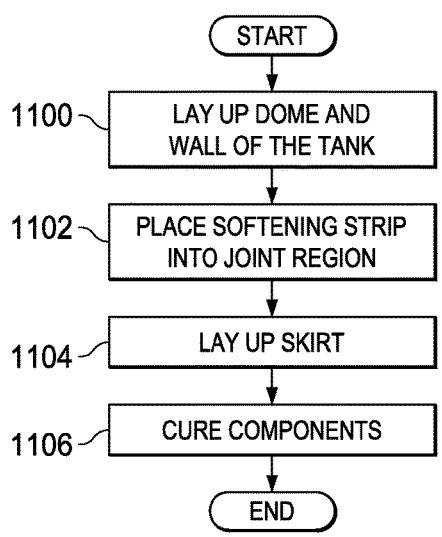
FIG. 11 is an illustration of a flowchart of a process for creating a Y-joint for a tank in accordance with a disclosed embodiment.

With reference to FIG. 11, a flowchart of a process for creating a Y-joint for a tank is depicted in accordance with an embodiment. The process illustrated in FIG. 11 may be a detailed example of one implementation of the processes in FIG. 10. The process illustrated in FIG. may be used to create a Y-joint between a composite cryogenic tank and a composite skirt.

The process may begin by laying the dome and wall of the tank (operation 1100). Thereafter, a softening strip may be placed into the joint region (operation 1102). In operation 1002, the softening strip may be placed into the region with an adhesive film.

Next, a skirt structure is laid up (operation 1104). The skirt structure may be laid up over the area where the dome and wall may be located along with the softening strip. The components are then cured (operation 1106), with the process terminating thereafter. The curing step may be performed using heat and/or pressure. This curing may be performed using an autoclave or some other suitable oven. In other embodiments, these components may be cured using an electron beam. The result of curing operation 1106 may be a joint similar to joint 520 in FIG. 5.

Figure 12:
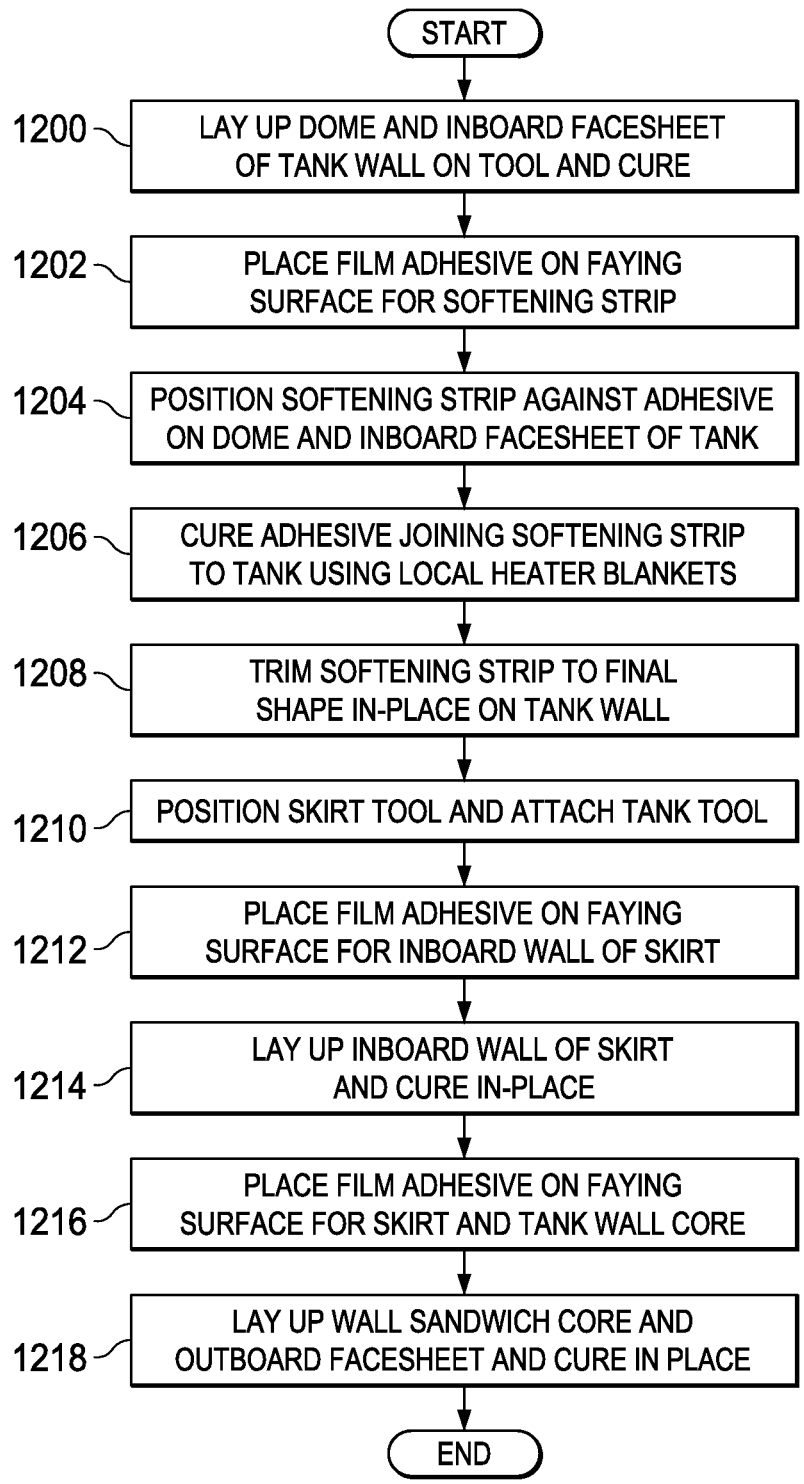
FIG. 12 is an illustration of a flowchart of a process for creating a Y-joint between a composite cryogenic tank and a composite skirt in accordance with a disclosed embodiment.

With reference now to FIG. 12, another flowchart of a process for creating a Y-joint between a composite cryogenic tank and a composite skirt is depicted in accordance with an embodiment.

The process may begin by laying up the dome and inboard face sheet of the wall of the tank on a tool and curing the lay up (operation 1200). The dome may be, for example, without limitation, dome 506, and the face sheet of the tank wall may be for a wall such as, for example, without limitation, wall 510 in FIG. 5. In these examples, the tool may be a mold for the shape of the different composite components.

The process may place a film adhesive on faying surfaces 704 and 706 on the softening strip (operation 1202). The softening strip in operation 1202 may be a softening strip such as, for example, without limitation, softening strip 606 in FIG. 7. In these examples, faying surfaces 704 and 706 are the surfaces of a structure that are to be bonded to another structure. In other words, when two structures are bonded to each other, the surfaces that contact each other to form the joint may be referred to as the faying surfaces.

The process may then position the softening strip against the adhesive on the dome and inboard face sheet for the wall of the tank (operation 1204). The process may then cure the adhesive joining softening strip to the tank using local heater blankets (operation 1206). After operation 1206, the softening strip may be bonded to the tank wall. The softening strip may then be trimmed into a final shape in place on the tank wall (operation 1208). The process may then position a skirt tool and attach the skirt tool to the tank tool (operation 1210).

The process may then place film adhesive on faying surfaces 704 and 706 for the inboard wall of skirt 512 (operation 1212). The process may then lay up the inner wall of the skirt and cure the component in place (operation 1214).

Next, adhesive may be placed on faying surfaces 704 and 706 for skirt 512 and core 602 (operation 1216). Core 602 may be the structural elements located between two face sheets for the wall of the structure. The process may then lay up the wall sandwich core and outboard face sheet and cure the components in place (operation 1218) with the process terminating thereafter. In operation 1218, the outboard face sheet may be, for example, outboard skin 600 in FIG. 6.

Figure 13:
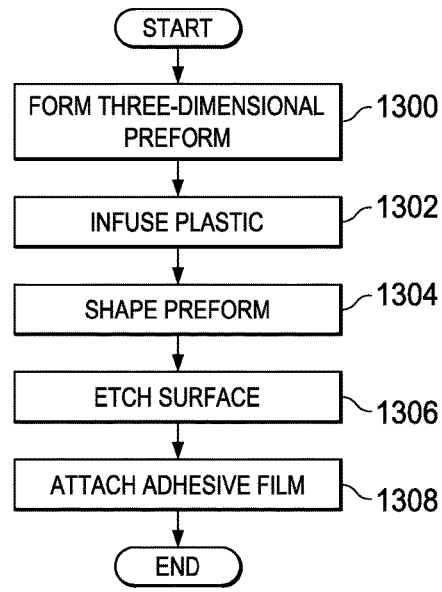
FIG. 13 is an illustration of a flowchart of a process for creating a softening strip in accordance with a disclosed embodiment.

With reference now to FIG. 13, a flowchart of a process for creating a softening strip is depicted in accordance with an embodiment. The process illustrated in FIG. 13 may be used to create a softening strip for use in the operations in FIGS. 11 and 12.

The process may begin by forming a three-dimensional preform (operation 1300). In these examples, operation 1300 may be performed using, for example, without limitation, braiding fibers, weaving fibers, stacking materials and performing z-pinning, or some other suitable process.

Next, a plastic matrix may be infused into the three-dimensional preform (operation 1302). In these examples, the plastic matrix may be a Teflon®. polymer. With this type of polymer, a dry powder may be placed onto the three-dimensional preform and worked into the preform. For example, the infusion in operation 1302 may involve vibrating the preform and then applying heat and pressure to perform the infusion into the preform. The heat and pressure in operation 1302 may be performed using an autoclave.

The preform may be shaped (operation 1304). In operation 1304, the preform may be machined, cut, or shaped using some other suitable process into a shape for use in a Y-joint. The process may etch the surfaces, faying surface 704 and faying surface 706 of the softening strip (operation 1306). This etching may be an acid etch. Tertra-Etch®. fluorocarbon etchant is an example of a commercially available etchant used to prepare fluorocarbon surfaces for bonding. Tertra-Etch®. fluorocarbon etchant may be available from W. L. Gore and Associates, Inc., and Tertra-Etch®. is a trademark of W. L. Gore and Associates, Inc. This etching may be used to allow an adhesive film to be attached to the surface of the preform. The process may then attach an adhesive film to each side, side 708 and side 707, of the softening strip (operation 1308), with the process terminating thereafter. The adhesive strips may allow the softening strip to be attached and cured to the skirt and the dome of the tank during the curing process.

Figure 14:
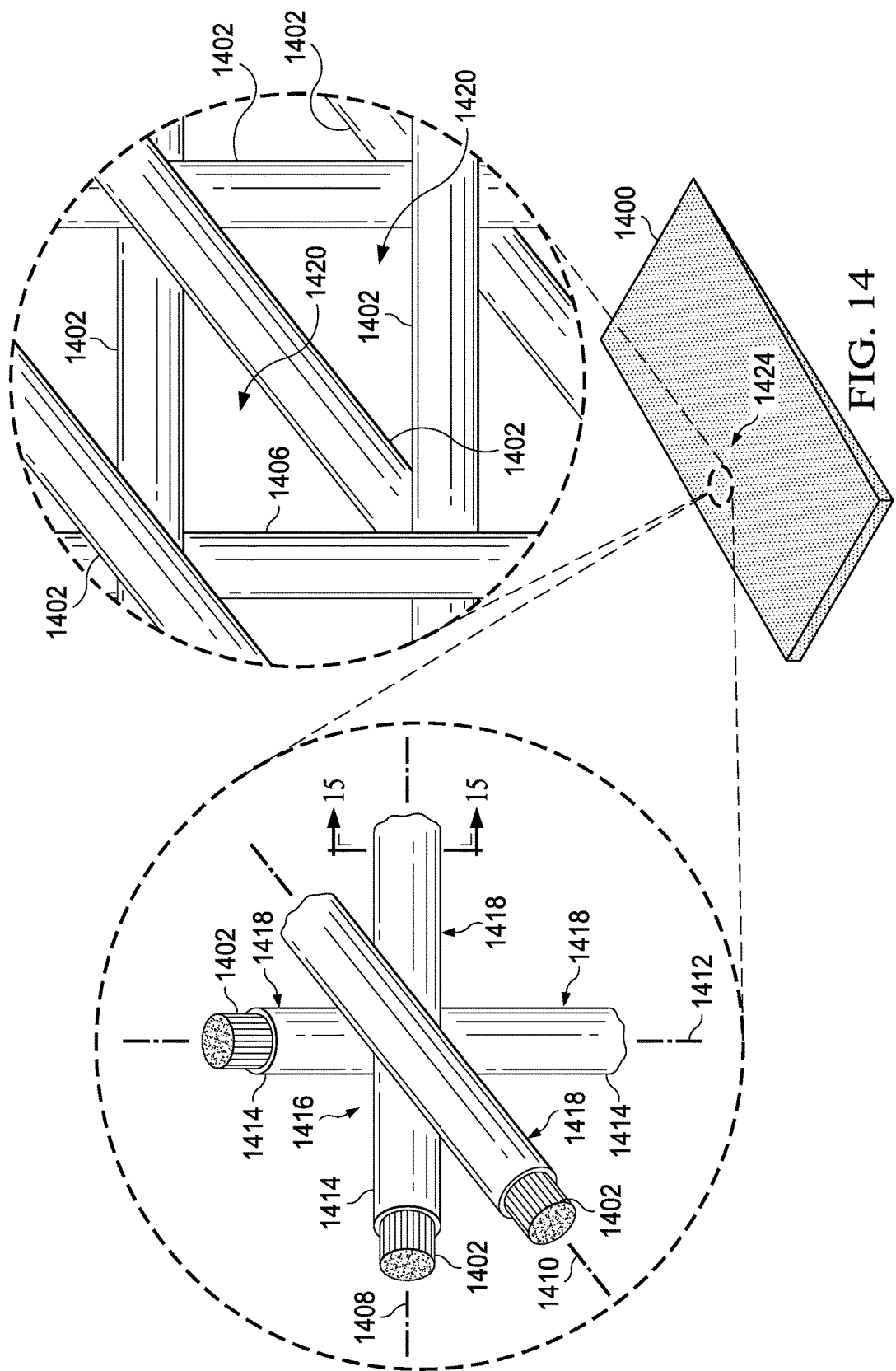
FIG. 14 is an illustration of a perspective view an alternate embodiment of a three dimensional fabric preform having fibers coated with a plastic binder, certain of the intersecting fibers being enlarged for clarity.

Attention is now directed to FIG. 14 which illustrates a further embodiment of a softening strip 1400 that may be placed in a joint between the surfaces of two structures, such as the joint 520 (FIG. 6) between the tank dome 506 and the tank wall 510 previously described. The softening strip 1400 functions to control stress in the joint 520 and comprises a three-dimensional porous fabric preform 1424 infused with a plastic binder. Specifically, the softening strip 1400 linearizes stress in the joint 520, thereby reducing peak stress in the joint 520, even at cryogenic temperatures.

The three dimensional fabric preform 1424 comprises fibers 1402 that are woven, braided, layered or otherwise arranged together such that the fiber preform 1424 is structurally self-supporting, and has a relatively high strain capability. The constituent fibers 1402 are arranged to provide the fiber preform 1424 with resiliency when subjected to stress, even at cryogenic temperatures. The fibers 1402 may comprise, without limitation, carbon fibers that are arranged along substantially orthogonal axes 1408, 1410, 1412, and are generally proportional and evenly distributed throughout the fabric preform 1424, providing the fiber preform 1424 with quasi-isotropic properties. In other embodiments however, the fibers 1402 need not be orthogonal, proportional or evenly distributed.

The use of carbon fibers provides the softening strip 1400 with high-strength and a relatively low CTE, resulting in a fiber preform 1424 that is cohesive, may be easily machined into the desired final shape and can be handled during tank manufacturing processes. Other fibers may be used, including but not limited to glass fibers, aramid fibers and metal fibers, providing they exhibit the necessary strength, and flexibility at cryogenic temperatures. As used herein, "cryogenic temperatures" includes temperatures that are generally below approximately −150 degrees F. In one embodiment, fibers 1402 may be used that have a diameter within the range of approximately 2 and 15 microns.

The plastic binder, when sintered as described below, forms a plastic coating 1414 that encapsulates the fibers 1402 and provides the fiber preform 1424 with sufficient rigidity to allow it to be machined to a final desired shape suitable for the application, while contributing to the elastic flexibility and compliance of the softening strip 1400 at cryogenic temperatures. The plastic binder may comprise any of the thermoplastics previously described, such as, without limitation, FEP (fluorinated ethylene propylene), which has a melting point of approximately 500 degree F. Other fluoropolymers may also be suitable. The plastic binder chosen for a particular application should be elastically compliant and have sufficient softness and flexibility both at room temperatures and at cryogenic temperatures, yet remain stable at temperatures at which the composite thermoset resin components of a structure are thermally cured, which typically may be in the range of approximately 300 and 400 degrees F. Additionally, the plastic binder should have a low CTE, relatively close to that of the fibers 1402. Selecting materials for the fibers 1402 and the plastic binder having CTE's that are close to the CTE of the composite resin used in the tank dome 506 and the tank wall 510 will minimize any thermally induced stresses in the joint 520.

Figure 15:
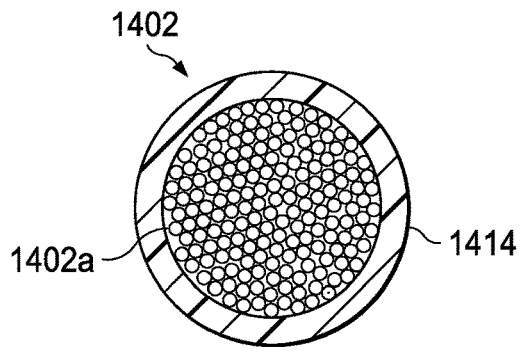
FIG. 15 is illustration of a sectional view taken along the line 15-15 in FIG. 14.

In FIG. 14, the fabric preform 1424 is shown as comprising individual, generally orthogonal fibers 1402. However, as shown in FIG. 15, each of the fibers 1402 illustrated in FIG. 14 may be a yarn 1402 comprising a plurality of relatively small diameter, interlocked fibers 1402*a* that may be twisted, bonded or otherwise joined together to form a cohesive thread, sometimes referred to in the art as a "single". Thus, as used herein, the term "fiber" is intended to include a single fiber, a bundle of fibers or a combination of single fibers and bundles of fibers.

Figure 16:
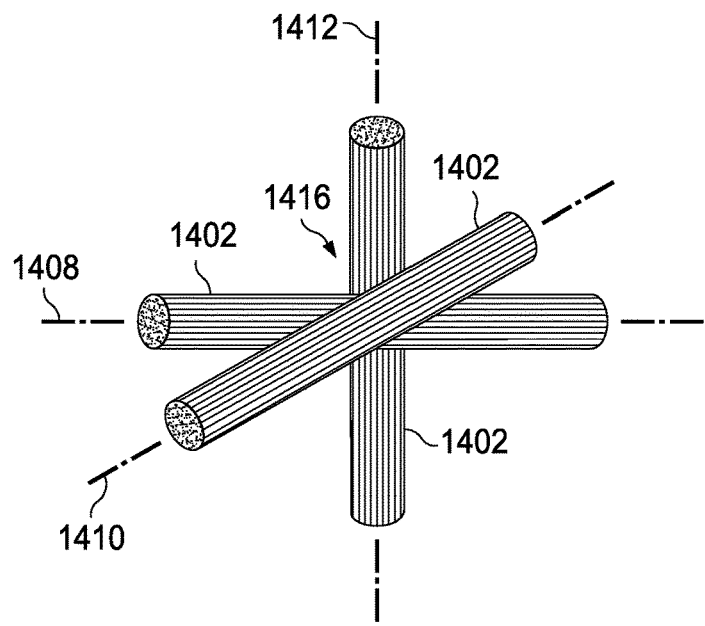
FIG. 16 is an illustration of a perspective view of intersecting fibers forming part of the fabric preform prior to being coated with the plastic binder.

Referring to FIG. 16, when initially fabricated into the three-dimensional preform 1424, and prior to being coated with a plastic binder, the orthogonal fibers 1402 may intersect and contact each other at intersections 1416. As shown seen in FIG. 17, after the fiber preform 1424 is infused with a plastic binder, the resulting plastic coating 1414 surrounds the fibers 1402 and may encapsulate multiple fibers 1402 at the intersections 1416. However, as shown in FIG. 14, the spacing between the fibers 1402, both before and after being coated with the plastic binder, is such that the fabric preform 1424 contains porosities 1420, rendering the softening strip 1400 porous. This porosity assists in maintaining the softness and flexibility of the softening strip 1400 at cryogenic temperatures.

Figure 17:
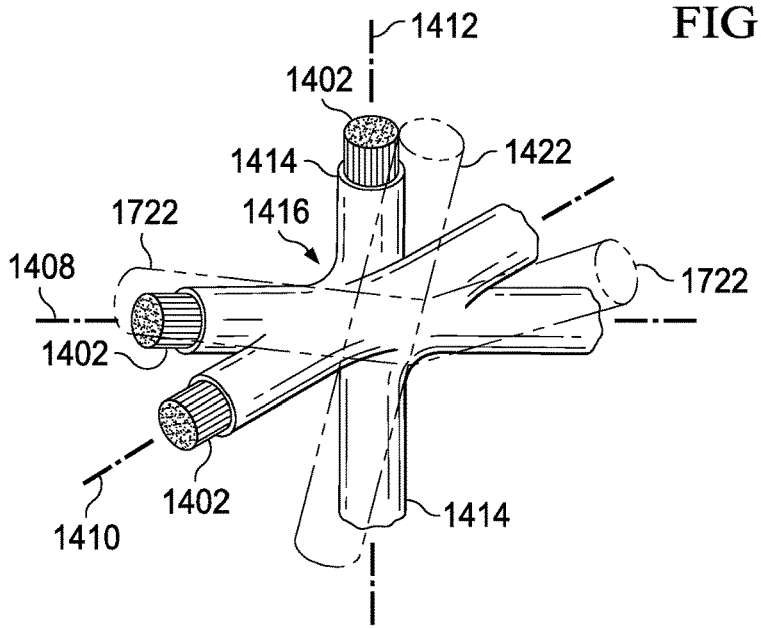
FIG. 17 is an illustration similar to FIG. 16 but showing the fibers after being coated with the plastic binder, broken lines indicating displaced portions of the coated fibers caused by joint loading.

Referring to FIG. 17, when loads are transmitted through the softening strip 1400, the strong, but flexible fibers 1402 may bend, flex or otherwise move relative to each other, thereby absorbing some of the stress in the joint and reducing peak stresses. For example, the fibers 1402 may individually or together, shift or flex to the positions shown by the broken lines 1722 as loads are transmitted through the joint 520 (FIG. 6). As the individual fibers 1402 of the three-dimensional fabric preform 1424 are displaced in this manner, the plastic coating 1414 remains sufficiently soft and flexible such that it flexes and moves along with the fibers 1402, even at cryogenic temperatures.

Figure 18:
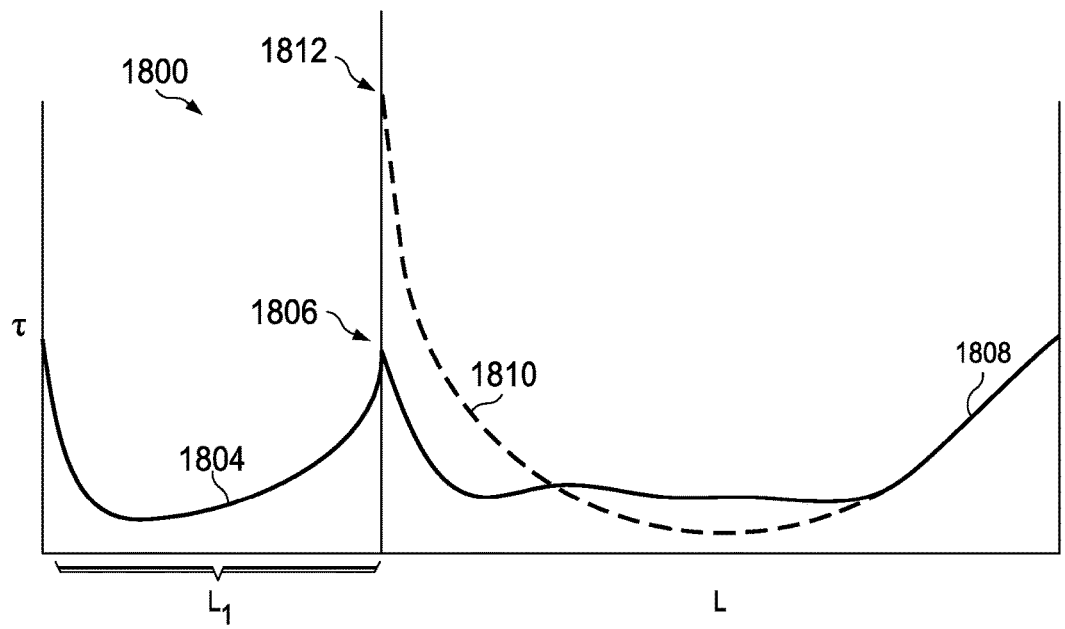
FIG. 18 is an illustration of a graph of shear stress in the Y-joint shown in FIGS. 3, 5 and 6 along its length.

FIG. 18 illustrates a graph 1800 showing the stress τ in the joint 520 (FIG. 6) along its length L, wherein the length of the softening strip 1400 is indicated as $L_1$. The broken graph line 1810 represents the stress in the joint 520 in the absence of the use of the softening strip 1400, and reveals that the peak stress 1812 occurs at the beginning of the joint 520. Graph line 1804 represents the stress τ transmitted through the joint 520 along the length $L_1$ of the softening strip 1400. As is apparent from graph 1800, the softening strip 1400 assists in controlling and distributing the stress τ, causing a reduction in the peak stress τ at the beginning of the joint from the level shown at 1812 to the level shown at 1806.

Figure 19:
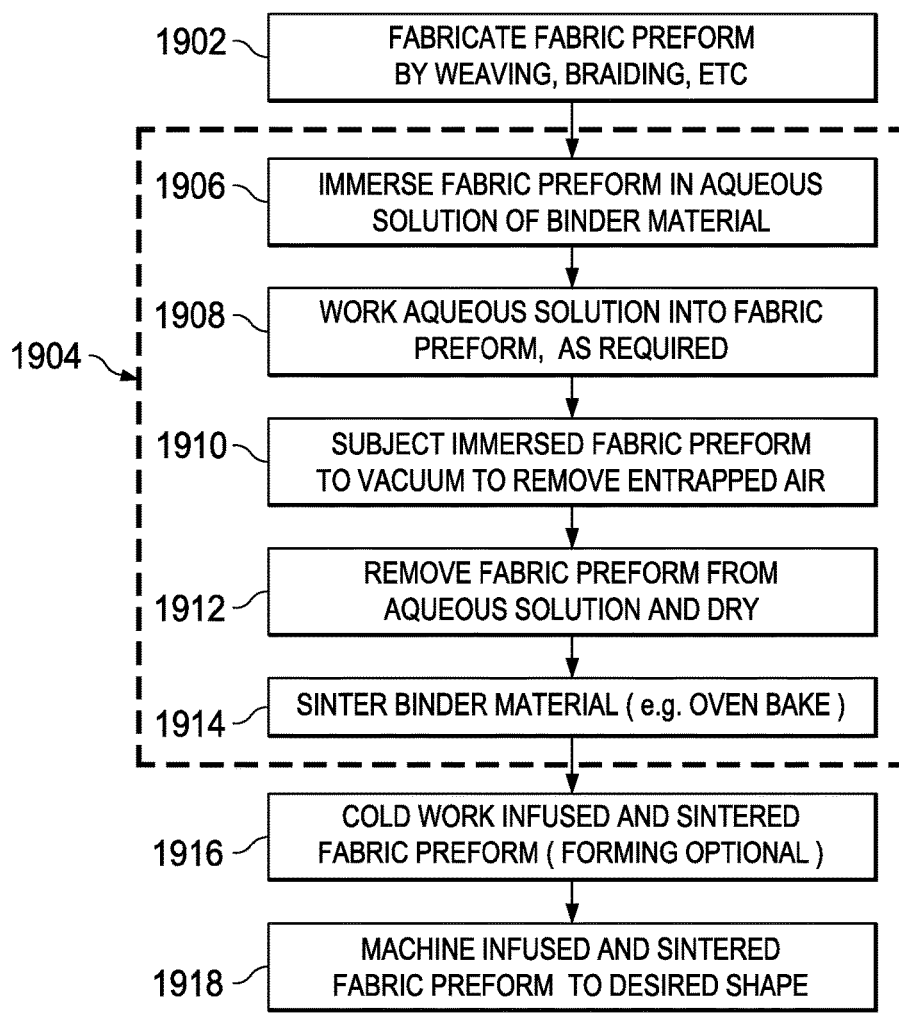
FIG. 19 is an illustration of a flow diagram of a method of making a softening strip using the fabric preform shown in FIG. 14.

Attention is now directed to FIG. 19 which illustrates the overall steps of a method of fabricating the softening strip 1400. Beginning at 1902 a suitable three-dimensional fabric preform 1424 is fabricated by weaving, braiding or other suitable processes in which fibers 1402 are assembled together into a substantially uniform, self-supporting structure. As previously described, the fibers 1402 may comprise carbon or other types of fiber materials that are suitable for the application and exhibit the desired degree of strength and flexibility at cryogenic temperatures. The fabric preform 1424 fabricated at step 1902 is then coated with a suitable plastic binder in a series of steps shown at 1904.

At step 1906, the three-dimensional fabric preform 1424 is immersed in an aqueous solution of a plastic binder material such as, without limitation, a thermoplastic such as FEP as previously discussed. The aqueous solution may be made by introducing fine dry particles of the plastic binder into water or other suitable liquid carrier, in a concentration that is dependent on the application. The particles of the plastic binder may remain dispersed throughout the aqueous solution, and may not settle out, thus avoiding the need for periodic agitation or mixing of the solution. At 1908, it may be necessary to work the aqueous solution into the fabric preform by massaging the fabric preform 1424, due to the fact that the fabric preform 1424 may be tightly woven, and though porous, may not readily admit and fully saturate with the aqueous solution. This "working" of the fabric preform 1424 in the aqueous solution may be performed by hand or using a suitable machine that causes movement and agitation between the fabric preform 1424 and the aqueous solution.

At step 1910, the fabric preform 1424 may be subjected to a vacuum while still immersed in the aqueous solution of plastic binder in order to remove any air bubbles entrapped within the fabric preform 1424 and assure that the fabric preform 1424 is completely saturated with the aqueous solution. Air bubbles are undesirable because they may prevent wetting of the fibers 1402 with the solution. The fiber preform 1424 remains immersed in the aqueous solution for the length of time necessary for the fiber preform 1424 to become fully saturated, such that all of the fibers 1402 become wetted. At step 1912, the saturated fabric preform 1424 is removed from the aqueous solution and then dried using any suitable technique, including but not limited to simple air drying. This drying process results in the plastic binder particles in the aqueous solution adhering to each other and to the fibers 1402, thereby covering the fibers 1402 of the fabric preform 1424. At step 1914, in order to cause the adhered particles of plastic binder to coalesce into a consolidated coating, the infused fabric preform 1424 is placed in an oven and baked at a temperature high enough to result in fuse-melting or sintering of the binder particles. Where FEP is used as the binder material, sintering may be achieved at a temperature of approximately 620 degrees F.

The sintering in step 1914 may result in the plastic coating causing the fibers 1402 of the fabric preform 1424 to be bound together at the intersections 1416, rendering the fabric preform 1424 less flexible than desired. In order to achieve the desired flexibility and softness at cryogenic temperatures, the infused and sintered fabric preform 1424 may be mechanically worked through cold working or forming at step 1916, as will be discussed later in more detail. This cold working of the infused and sintered fabric preform may fracture any bonds that may be created between the fibers 1402 of the fiber preform 1424, particularly at the intersections 1416, and/or may break or crack the plastic coating 1414, thereby "loosening" the fabric preform 1424 so that it is more flexible and better suited to linearize the stresses in the joint 520 at cryogenic temperatures.

As was the case in the embodiments previously described, at step 1718, the coated fabric preform 1424 may be machined to a shape that matches the geometry of the joint 520, using any suitable machining technique. In the case of the domed tank previously discussed, the fabric preform 1424 may be machined into a tapered or wedge-shaped cross section so that the stiffness of the secondary load paths continually increases as the loads approach the original joint. This feature may result in a more uniform transfer of shear across the joint at a consistently low level.

Figure 20:
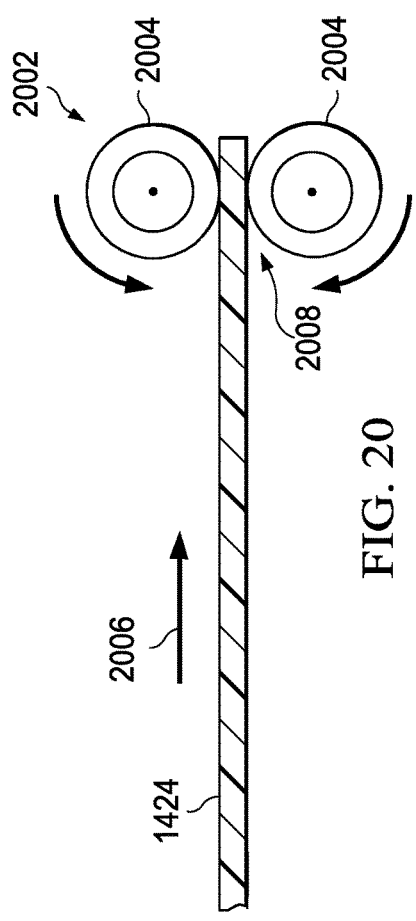
FIG. 20 is an illustration of a diagrammatic view of a fabric preform being passed through a roll forming machine.

Attention is now directed to FIG. 20 which illustrates one technique for cold working a flat, infused three-dimensional fabric preform 1424. In this example, apparatus such as a roll forming machine 2002 may be used to both cold work the fiber preform 1424 and compress it in order to "loosen" both the fibers 1402 and the plastic coating 1414, as previously described. The roll forming machine 1802 may comprise a pair of rollers 2004 rotating in opposite directions. The fabric preform 1424 is fed 2006 into a nip 2008 between the rollers 2004. Depending on the positions and configuration of the rollers 2004, the fabric preform 1424 may be rolled into a desired contour or curvature suitable for the application. Also, depending the application, the fiber preform 1424 may be machined before or after it is cold worked.

Figure 21:
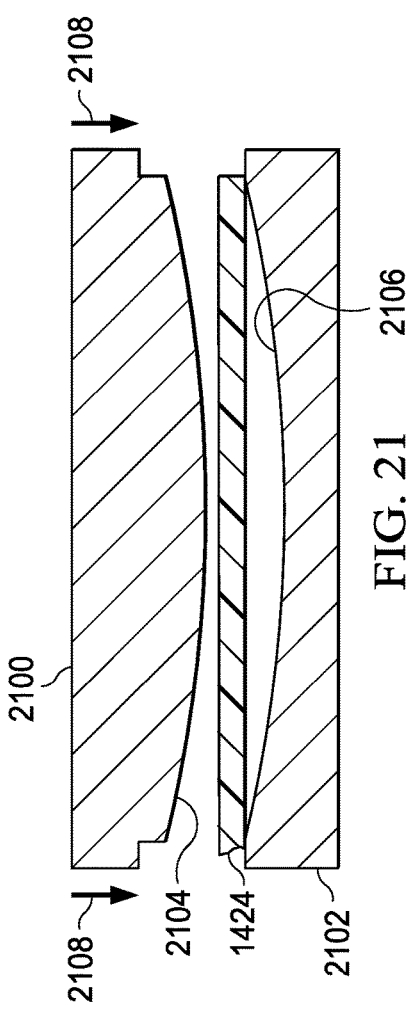
FIG. 21 is an illustration of a side view of a fabric preform being formed between two dies.

FIG. 21 illustrates another technique for simultaneously cold working and shaping a fabric preform 1424 into a desired shape. In this example, a pair of matched dies 2100, 2102 respectively having matched die surfaces 2104, 2106 are used to cold work the fiber preform 1424 while forming it into the desired shape. The matched dies 2100, 2102 may be placed in a press (not shown) and the fiber preform is placed between the dies 2100, 2012. The press displaces 2108 one of the dies 2100, forcing the fiber preform 1424 into the second die 2102, thereby compressing and forming the fabric preform 1424 to shape.

Figure 22:
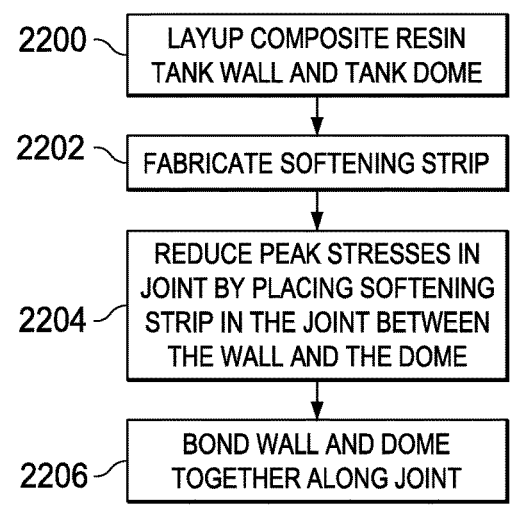
FIG. 22 is an illustration of a flow diagram of a method of making a tank used in cryogenic environments.

Attention is now directed to FIG. 22 which illustrates the overall steps of a method of fabricating a cryogenic tank in which the softening strip 1400 is used to reduce peak stresses in one or more joints 520. Beginning at step 2200, a composite resin tank wall 510 and a tank dome 506 are laid up. The tank wall 510 and the tank dome 506 may each comprise a multi-ply layup of a fiber reinforced thermoset resin, such as, without limitation, an epoxy or BMI (bismaleimide), reinforced with fibers such as carbon fibers. At step 2202, a suitable softening strip 1400 is fabricated using the process previously described, and shown in FIG. 19. At step 2204, the softening strip 1400 is placed in a joint 520 between the tank wall 510 and the tank dome 506 during layup step 2200. The softening strip 1400 functions to reduce stresses in the joint 520, including those occurring at cryogenic temperatures. At step 2206, the tank dome 506, the tank wall 510, and the softening strip 1400 are co-bonded, as previously described in connection with FIGS. 10-13.

The different operations shown in the flowcharts may not be inclusive of all of the different steps that may be performed for the different embodiments. For example, other operations such as, for example, without limitation, preparation for bonding, shimming, caul plating, and other suitable operations may be performed during the different processes illustrated above. Also, in some embodiments, some of the operations may be performed concurrently or in different orders, depending upon the particular implementation.

Thus, the different embodiments provide a method and apparatus for increasing the strength of a joint between different structures. The different embodiments may include a three-dimensional preform with a plastic matrix impregnated or infused into the three-dimensional preform to form a softening strip. This softening strip is capable of remaining flexible at a temperature in which a material having a gas form at an ambient temperature has a liquid form.

The description of the different embodiments has been presented for purposes of illustration and description, and is not intended to be exhaustive or limited to the embodiments in the form disclosed. Many modifications and variations will be apparent to those of ordinary skill in the art.

Although the different illustrative examples show the use of a softening strip in a Y-joint for a spacecraft, this softening strip may be used in objects other than spacecraft. For example, without limitation, a softening strip may be used in a joint for structures in a submarine, an aircraft, a building, a dam, a manufacturing facility, a power plant, a tank, a car, or some other suitable object.

Further, different embodiments may provide different advantages as compared to other embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method of making a softening strip for controlling stress in a joint, comprising:
producing a fabric preform having fibers extending in three dimensions, wherein the fibers are arranged along three substantially orthogonal axes and are evenly distributed throughout the fabric preform to form a grid of fibers extending in three dimensions and having intersections such that three or more of the fibers intersect at any given intersection of the intersections, wherein each intersecting fiber has a single point of contact with each other intersecting fiber at any given intersection; and
coating surfaces of the fibers with a thermoplastic polymer binder, wherein the thermoplastic polymer binder encapsulates each intersection to form a unified junction of fibers.

2. The method of claim 1, wherein coating surfaces of the fibers includes:
preparing an aqueous solution containing particles of the thermoplastic polymer binder,
immersing the fabric preform in the aqueous solution to form an infused fabric, and
adhering the particles of the thermoplastic polymer binder to the surfaces of the fibers by drying the infused fabric.

3. The method of claim 2, wherein coating surfaces of the fibers includes:
placing the infused fabric in a vacuum, and
using the vacuum to draw air bubbles from the aqueous solution.

4. The method of claim 2, wherein coating surfaces of the fibers includes heating the particles of the thermoplastic polymer binder adhered to the fibers until the particles of the thermoplastic polymer binder melt and flow together around the fibers.

5. The method of claim 4, wherein the heating includes heating the particles of the thermoplastic polymer binder to a temperature of at least 500° F.

6. The method of claim 1, wherein coating surfaces of the fibers includes:
adhering binder particles to the surfaces of the fibers, and
sintering the binder particles.

7. The method of claim 1, further comprising:
loosening bonds between the coated surfaces of the fibers by cold working the fabric preform.

8. The method of claim 7, wherein cold working the fabric preform is performed by one of:
passing the fabric preform through and compressing the fabric preform between a pair of rollers, and
pressing the fabric preform between two dies.

9. The method of claim 7, further comprising shaping the fabric preform as the bonds between the coated surfaces of the fibers are being loosened.

10. The method of claim 7, further comprising:
machining the fabric preform with the coated surfaces of the fibers to a desired
shape related to the joint.

11. The method of claim 6, wherein the fabric preform includes one of:
woven fibers,
braided fibers,
stacked layers of fibers,
stitched fibers, and
pinned layers of fibers.

12. The method of claim 6, wherein the fibers are selected from the group consisting of:
graphite fibers,
glass fibers, and
aramid fibers.

13. The method of claim 6, wherein:
the fibers include fibers extending along three substantially orthogonal axes, and
the fabric preform has a shape matching the joint and is in face-to-face contact with each of the surfaces.

14. The method of claim 6, wherein the fibers include fibers having a diameter within a range of 2 to 15 microns.

15. The method of claim 6, wherein the thermoplastic polymer binder is a polymer that is compliant at both room temperature and at cryogenic temperatures.

16. The method of claim 6, wherein:
the thermoplastic polymer binder is a fluoropolymer exhibiting flexibility at temperatures below −150° F. and stability at temperatures up to 400° F., and
the fibers are graphite fibers.

17. The method of claim 6, wherein the fabric preform is porous and is flexible at cryogenic temperatures.

18. The method of claim 6, wherein the fibers and the thermoplastic polymer binder are flexible at cryogenic temperatures.

19. A method of manufacturing a structural assembly, comprising:
forming a first composite resin structure having a first surface;
forming a second composite resin structure having a second surface;
forming a joint between the first and second surfaces, wherein the joint connects the first and second surfaces; and
forming a softening strip in the joint for controlling stress in the joint, wherein forming the softening strip further comprises:
producing a fabric preform having fibers extending in three dimensions, wherein the fibers are arranged along three substantially orthogonal axes and are evenly distributed throughout the fabric preform to form a grid of fibers extending in three dimensions and having intersections such that three or more of the fibers intersect at any given intersection of the intersections, wherein each intersecting fiber has a single point of contact with each other intersecting fiber at any given intersection; and
coating surfaces of the fibers with a thermoplastic polymer binder, wherein the thermoplastic polymer binder encapsulates each intersection to form a unified junction of fibers.

20. The method of claim 19, wherein the joint is Y-shaped and the softening strip is wedge shaped, and wherein the method further comprises:
placing the softening strip in face-to-face contact with the first and second surfaces.

21. The method of claim 20, further comprising:
linearizing, using the softening strip, the stress in the joint at cryogenic temperatures.

22. The method of claim 20, wherein the thermoplastic polymer binder has a melting point higher than a temperature required to cure the first and second composite resin structures.

23. The method of claim 19 wherein:
producing the fabric preform having fibers extending in three dimensions comprises arranging the fibers along substantially orthogonal axes in a generally proportional and evenly distributed manner throughout the fabric preform, such that the orthogonal fibers intersect and contact each other at intersections; and
coating surfaces of the fibers with a thermoplastic polymer binder comprises surrounding the fibers and encapsulating multiple fibers at the intersections, such that spacings between the fibers remain, whereby porosities are provided in the fabric preform.

24. A method of making a softening strip for controlling stress in a joint, comprising:
producing a fabric preform having fibers extending in three dimensions, including:
arranging a first plurality of fibers in parallel along a first longitudinal axis;
arranging a second plurality of fibers in parallel along a second longitudinal axis orthogonal to the first longitudinal axis, wherein the second plurality of fibers intersects the first plurality of fibers;
arranging a third plurality of fibers in parallel along a third longitudinal axis orthogonal to the first and second longitudinal axes, wherein the third plurality of fibers intersects the first and second pluralities of fibers;
wherein the orthogonal fibers intersect and contact each other at intersections in an evenly distributed manner throughout the fabric preform, and wherein each intersection includes at least three fibers arranged along corresponding ones of the three orthogonal axes, wherein each intersecting fiber has a single point of contact with each other intersecting fiber at any given intersection; and
coating surfaces of the fibers with a thermoplastic polymer binder, wherein the thermoplastic polymer binder encapsulates each intersection to form a unified junction of fibers and spacings between fibers remain, whereby porosities are provided in the fabric preform.

25. The method of claim 1, wherein producing the fabric preform further comprises:
arranging a first plurality of fibers in parallel along a first longitudinal axis;
arranging a second plurality of fibers in parallel along a second longitudinal axis orthogonal to the first longitudinal axis, wherein the second plurality of fibers intersects the first plurality of fibers; and
arranging a third plurality of fibers in parallel along a third longitudinal axis orthogonal to the first and second longitudinal axes, wherein the third plurality of fibers intersect the first and second pluralities of fibers.

26. The method of claim 1, wherein spacing between the fibers both before and after coating surfaces of the fibers with the thermoplastic polymer binder is such that the fabric preform contains porosities, rendering the softening strip porous.

27. The method of claim 1, wherein coating surfaces of the fibers with the thermoplastic polymer binder encapsulates multiple fibers at the intersections.

* * * * *